United States Patent [19]
Burch et al.

[11] Patent Number: 6,088,708
[45] Date of Patent: *Jul. 11, 2000

[54] SYSTEM AND METHOD FOR CREATING AN ONLINE TABLE FROM A LAYOUT OF OBJECTS

[75] Inventors: Warren Burch, Redmond; Matthew Charles Gauthier, Seattle, both of Wash.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/792,638

[22] Filed: Jan. 31, 1997

[51] Int. Cl.$^7$ .............................. G06F 15/00; G06F 17/21
[52] U.S. Cl. .............................................. 707/509; 707/517
[58] Field of Search ..................................... 707/509, 510, 707/511, 517, 518, 515, 526, 513, 519; 709/200, 203

[56] References Cited

U.S. PATENT DOCUMENTS

| | | | |
|---|---|---|---|
| 5,379,372 | 1/1995 | Wu | 395/148 |
| 5,893,127 | 4/1999 | Tyan et al. | 707/513 |

*Primary Examiner*—Joseph H. Feild
*Assistant Examiner*—Alford W. Kindred
*Attorney, Agent, or Firm*—Jones & Askew, LLP

[57] ABSTRACT

The objects are arranged into overlap groups. Each overlap group is bound by a rectangle (perimeter) and contains objects that, as a group, overlap each other while each overlap group does not overlap any other overlap group. Thus, the page is divided into distinct regions within each non-overlapping rectangle that contain the objects as laid out on the page. The boundaries of each rectangle provides the location for horizontal and vertical lines. These lines define rows and columns of a framework. The intersection of each row and column is a cell, used as a cell in the table representing the page. HTML elements are emitted into an HTML stream in order to define the layout of cells in the table and to populate each cell as either empty or with HTML elements representing the overlap group corresponding to the location of the cell. The HTML elements representing non-empty cells are either native text elements (if possible) or image elements (if native text does not preserve the layout of the overlap group corresponding to the non-empty cell). Therefore, the HTML elements represent and preserve the layout of objects within each overlap group in a memory efficient manner. Additional HTML elements can be added to a cell to preserve existing hyperlinks. Furthermore, nested tables can be created within a single cell of a larger table in order to provide text adornments associated with objects on the page in an efficient manner

44 Claims, 14 Drawing Sheets

SYSTEM AND METHOD FOR CREATING AN ONLINE TABLE FROM A LAYOUT OF OBJECTS

TECHNICAL FIELD

This invention generally relates to creating an online table from a page of objects and, more particularly described, relates to creating a hypertext markup language (HTML) layout table from a layout of one or more overlapping or non-overlapping objects that efficiently preserves the layout of the objects, preserves any existing hyperlinks associated with the objects, and provides an efficient way to adorn objects represented within the HTML layout table.

BACKGROUND OF THE INVENTION

"Surf's up!" This used to be the battle cry of adventurous beach-side surfers when waves on the beach looked enticing. Upon hearing this cry, other interested surfers would grab their surfboards and head for the nearest beach to enjoy themselves by surfing the waves. These days, the traditional surf is no longer limited to the ocean. What has become known as "surfing the Web" is a phrase generally heard from computer users who have logged onto the World Wide Web, a multimedia portion of the global Internet, using a special hypertext transfer protocol (http) to communicate with hypertext-enabled document servers. These servers maintain hypertext-enabled documents, also called Web pages. It is the content of these hypertext-enabled documents and the way the content of these documents is presented on the computer monitor that entices computer users to grab their computers instead of their surfboards and log onto the Web.

Basically, hypertext enabled-documents are documents with automatic links to other documents generally written in a hypertext markup language (HTML). HTML is a document layout and hyperlink specification language. In other words, HTML defines the structure and appearance of hypertext-enabled documents and provides a distribution mechanism for creating and sharing these documents, which are linked to other documents, over computer networks such as the Internet. More particularly, HTML defines the syntax and placement of special, embedded elements or directions that are not displayed by browsing software. These elements tell the browsing software how to display the contents of the document, including text and images. The language also tells how to make a document interactive through hypertext links (hyperlinks). These hyperlinks may be represented by text, images or parts of a single image, each of which a user can click on to seemlessly access another document.

Creating hypertext-enabled documents or Web pages is done by coding HTML elements into an HTML stream of elements, similar to a listing of program steps for a software application. Each bit of text, image, and hyperlink that should appear as part of the hypertext-enabled document is defined by these HTML elements. This task can be simplified by one of a variety of software applications which assist an author when creating a hypertext-enabled document from the ground up. Additionally, several software programs create hypertext-enabled documents from an existing document, also called an online version of the existing document, based upon the content and layout of the existing document.

Creating an online version of the existing document can become troublesome when the particular "what-you-see-is-what-you-get" (WYSIWYG) layout of objects comprising the existing document must be preserved. Overlapping objects on a traditionally printed page of an existing document create a pleasing visual effect. Objects containing a graphic image can be artfully layered over or behind text objects to create such an effect. Objects can also overlap each other on the page to give the illusion of a three-dimensional layout of the objects, conventionally referred to as z-ordering the objects. However, overlapping objects on the page is a problem when converting the page of the existing document to an online version for use on the World Wide Web or an intranet within a networked workgroup. In general, HTML does not easily or efficiently present the content of the objects exactly as laid out on the page of the existing document when objects overlap each other. This is because HTML concerns itself more with the content rather than the layout of information.

One way to solve this problem is to create a graphic image of the entire page and use the graphic image as the online version of the page. The graphic image preserves the content of the objects as well as the layout of the objects as they appear on the page. However, representing the page in this manner greatly increases the time to download the online version of the page (poor online performance) because of the large file size associated with graphic images. This is a problem because someone on the network may want to access the online version of the page but may become disinterested after waiting an undesirable amount of time to download it. Furthermore, the content of the objects may no longer be easily re-used when the graphic image is used to represent the content and layout of the objects.

Other attempts at solving this problem use a conventional HTML element called an HTML table. The HTML table is an element introduced in HTML 2.0 with Netscape Extensions (later incorporated into the HTML 3.0 standard). The HTML table is essentially a collection of information arranged in a framework of rows and columns. The intersection of each row and column of the table is called a cell. Cells in an HTML table can be merged to alter the layout of the cells. Thus, the layout (size and location) of the cells in the framework defines the presentation of the information or content contained within each cell.

Representations of each object on a page may be placed within the appropriately located cell of the HTML table to attempt to maintain the layout of objects as they appear on the page.

Using the HTML table element, other solutions, such as NetObjects Fusion marketed by NetObjects, Inc. of Redwood City, Calif., have taken objects arranged in a layout on a page and defined a table where the contents of the objects are defined as the contents of particular cells of the HTML table. However, if any of the objects are overlapping, the layout of objects on the page is not preserved because the NetObjects Fusion application separates the overlapping objects and inserts representations of each of the separated objects into different cells of the HTML table. In other words, the pleasing visual effect created on the page is not preserved and does not translate to the online version of the page using the NetObjects Fusion application when overlapping objects are encountered.

Another solution called WebPublisher is marketed by Assymetrix Corporation of Bellevue, Wash. With the WebPublisher application, the user is limited to predefined HTML tables with which to use when converting the page of the existing document (i.e., objects in the layout on the page) into an online version of the page.

Using the WebPublisher application, the online version of the page may not have the same layout when compared to the original layout of objects on the page. This approach is highly restrictive as the HTML table is static and cannot adapt itself.

Therefore, there is a need for a system for efficiently converting a page with overlapping objects from an existing document into an online version of the page (1) while preserving the WYSIWYG layout of the page, (2) while preserving any existing hyperlinks associated with the objects, (3) that avoids poor online performance due to an undesirable amount of time when downloading the online version of the page, and (4) uses existing browsing technology supporting tables without requiring any additional software when viewing the online version of the page. Furthermore, there is a need for a way of providing text adornments, such as drop-shadows, margins, or borders, to one of the objects on the page without having to create a graphic image of the object in the online version of the page.

SUMMARY OF THE PRESENT INVENTION

The present invention satisfies the above-described needs by providing a system and method for creating a table from a layout of objects on a page that preserves the layout of the objects in an efficient manner. These objects are typically text or graphic objects, similar to parts of a newsletter. The objects are typically laid out in a specific arrangement or layout where the objects may overlap each other. The table is preferably an HTML table. As previously mentioned, the HTML table is essentially a collection of information arranged in a framework of rows and columns. The intersection of each row and column of the table is called a cell. Thus, the layout (size and location) of the cells in the framework defines the presentation of the information or content contained within each cell. Any of the cells can be merged to create a new cell spanning multiple rows or columns. Elements, typically HTML elements, are used to populate the cells of the table generally by emitting the appropriate element defining the layout and content for each cell of the table on a cell by cell basis. In this way, representations of one or more objects on the page populate the appropriately located cells in the HTML table.

In general, the present invention provides a method where the objects are identified from the page layout relative to their location on the page. After identifying the objects, overlap groups of the objects are created based upon the specific layout of the objects. Each overlap group contains a single object or any other objects that overlap the single object. Additionally, each overlap group is bound by a rectangle and does not overlap the other overlap groups. In other words, the overlap groups organize the objects into distinct groups of objects that overlap while the rectangle around each group does not overlap rectangles around other groups.

Typically, the overlap groups are created by initially placing a rectangle around each of the objects and determining if any of the rectangles overlap each other. If so, the overlapping rectangles are replaced with another larger rectangle which surrounds each of the objects within the overlapping rectangles. This determination of whether there are any overlapping rectangles and replacing overlapping rectangles is repeatedly done until no more of the rectangles overlap each other. The remaining non-overlapping rectangles surround the objects in each of the overlap groups. Defining and using such overlap groups of the objects is advantageous because it recharacterizes the overlapping entitles (objects) into non-overlapping entities (overlap groups). These non-overlapping entities (overlap groups) can be used to preserve the layout of the objects on the page in an efficient manner.

The framework of cells for the table is defined from the rectangles bounding each of the overlap groups. Essentially, the framework is a series of rows and columns. Each row is defined by the top boundary and bottom boundary of the rectangle around each overlap group. Similarly, each column is defined by the left boundary and the right boundary of the rectangle around each overlap group. The intersection of each row and each column defines the location of the cells within the table.

The cells that correspond to the location of the overlap groups (or parts of the page called overlap regions associated with the overlap groups) are populated with elements. These elements, typically HTML elements, represent the objects within each of the overlap groups as they are laid out on the page. Generally, the cells are populated in a cell to cell basis (i.e., top to bottom and left to right). If a cell corresponds to a designated part of an overlap region associated with one of the overlap groups, any cells containing the overlap region are merged into a new single cell. Typically the designated part of the overlap region is the top left part. Thus, a larger single cell (the new merged cell) in the table is populated with elements representing the overlap group. In this manner, the table is created from the layout of objects that advantageously preserves the WYSIWYG layout from the page while at the same avoiding the use of a large amount of memory for a single image of the page.

If an overlap group corresponding to a cell contains only one object having a predefined rendering characteristic, then the element populating the cell representing the object is a text element. Typically, this text element is an HTML native text element that does not take up a large amount of memory when compare to HTML image elements. Essentially, the predefined rendering characteristic is a feature of an object allowing the element representing the object to be rendered as a memory-saving text element. Typically, the predefined rendering characteristic is when the object has unrotated text, no gradient-filled background, no pattern-filled background and no border art.

However, if the overlap group corresponding to the cell does not contain only one object having the predefined rendering characteristic, then the element populating the cell representing the object group is an image element. Typically, this image element is an HTML image element corresponding to the area of the page within the overlap group. The use of image elements that represent only a portion of the page advantageously conserves memory and helps to provide good online performance.

Additionally, if an object within the overlap group corresponding to the cell contains an existing hyperlink, then a hyperlink element also populates the cell. The hyperlink element provides the location of the existing hyperlink relative to the location of the object within the overlap group, typically by specifying an HTML image map. In this manner, the existing hyperlinks associated with the objects are advantageously preserved when creating an online version of the page of objects.

Furthermore, a cell in the table can be populated with a nested table in order to provide text adornments to an object. The nested table is generally the same kind of table described above, however, it is used to populate a single cell of the table. In this manner, the single cell of the table becomes the page or frame of reference for the nested table and the object and adornment features become objects laid out within the single cell of the table.

For example, the nested table can efficiently represent an object and other adornment features, typically rectangular margins, borders, or shadows, rather than using a graphic image to represent the adorned object. The adorned object is represented in a nested cell in the nested table. The adornment features are represented in nested cells adjacent to the unrotated text. Thus, using the nested table instead of a graphic image can be more memory efficient and make the overall table easier to download by not having to create a single graphic image to represent the adorned object and the adornment features. Furthermore, using the nested table allows the adornment features to stay in tact if a user desires to change the text size in the browser. Otherwise, the adornment features would become discontinuous.

Therefore, by breaking up the page into overlap groups of objects and only using image elements when necessary to represent the objects, the table provides an online version of the page with the same layout, that avoids lengthy downloading when viewing the table with browsing software, and that uses existing commercial browsing software to view the table without requiring any additional software.

The present invention and its advantages, those described above and otherwise, will be appreciated from studying the following detailed description and drawings, and the appended claims.

DETAILED DESCRIPTION OF THE PREFERRED EMBODIMENT

Figure 1:
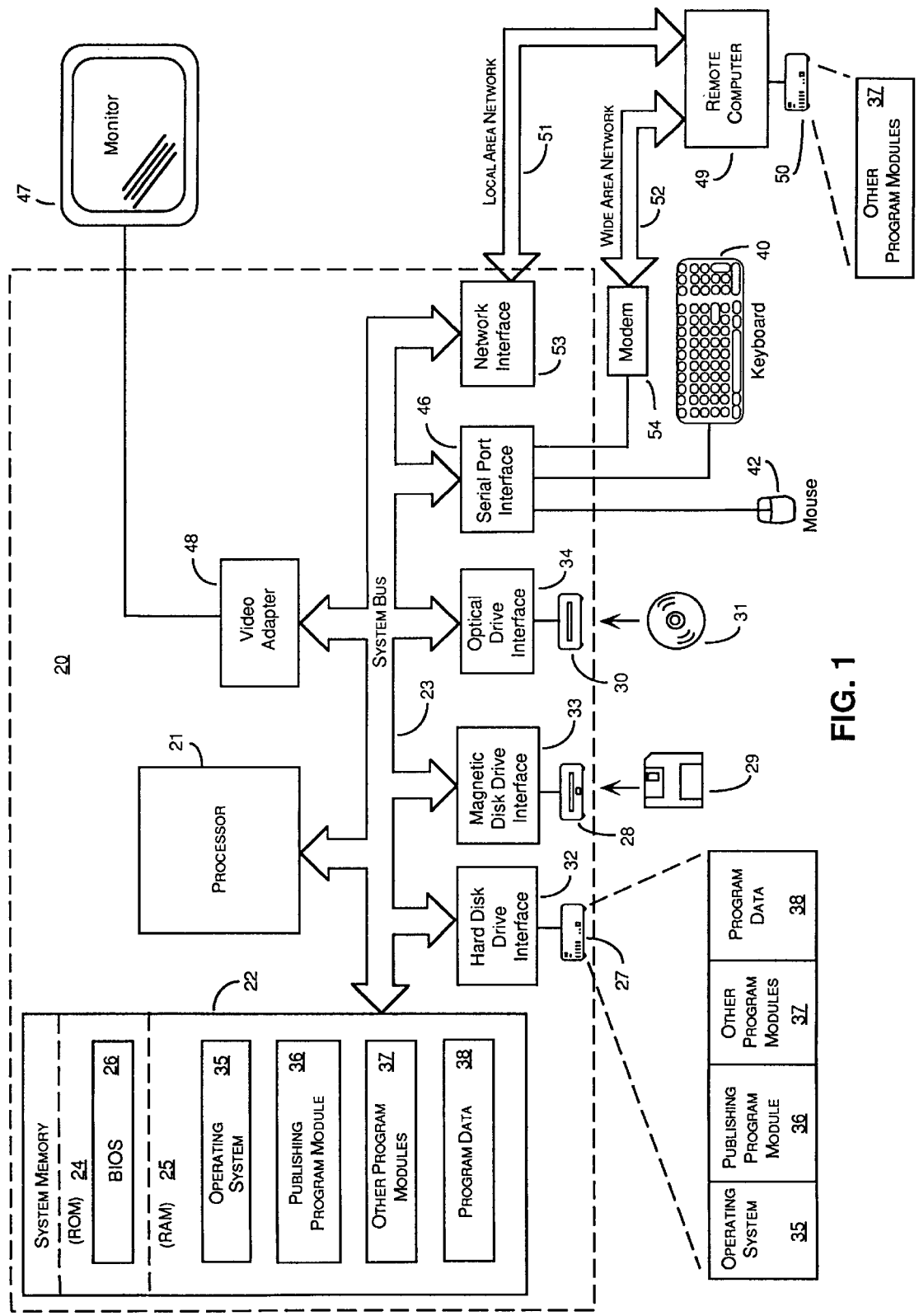
FIG. 1 is a block diagram of a personal computer that provides the operating environment for the preferred embodiment of the present invention.

The present invention is directed to a system for creating a table from a layout of objects on a page. The table is preferably a hypertext markup language (HTML) table that contains rows and columns of cells. Each cell in the table can contain content, preferably in the nature of HTML elements, such as the text of one of the objects on the page or an image of one or more overlapping objects on the page. The framework of cells and the content of each cell preserves the layout of the objects as they appear on the page while advantageously avoiding creating a single image for the whole layout. In other words, the table is essentially an HTML layout that efficiently represents the same layout of objects on the page. The preferred embodiment of the present invention is represented by a program module called "MICROSOFT PUBLISHER 97", which is a desktop publishing software application developed by Microsoft Corporation of Redmond, Wash.

Briefly described, the "MICROSOFT PUBLISHER 97" program module (publishing program module) allows a user create objects of text, graphics, or both. Additionally, the publishing program module allows the user to specify the particular layout of these objects on a page where the objects can overlap each other in order to form a creative and artistic layout. When creating an online version (a hypertext-enabled document or a Web page) of the page as laid out, the publishing program module creates overlap groups of the objects in order to isolate overlapping objects into distinct groups. Each overlap group includes a single object that does not overlap any other object on the page or a group of objects that overlap each other. Furthermore, the objects in the overlap group do not overlap any other object or group of objects on the page. In this way, the overlap groups are distinct groupings that do not overlap each other and are bound by non-overlapping rectangles. The publishing program module is able to generate an HTML table using the coordinates of the non-overlapping rectangles as the framework for the HTML table. The generated HTML table can then be used to display the page of objects on the World Wide Web of the Internet. This HTML table preserves the layout of objects in a what-you-see-is-what-you-get (WYSIWYG) fashion and preserves any existing hyperlinks associated with each individual object. Furthermore, the process of creating the HTML table can be used to create adornments, such as drop shadows, borders, and margins, for an object in an individual cell. These adornments are created while advantageously maintaining an efficient footprint of the generated HTML code and while maintaining robust and adaptable adornments associated with the object. The process of creating such an HTML table using the layout of objects on the page and the use of the created HTML table for text adornments is the focus of the present invention.

The detailed description which follows is represented largely in terms of processes and symbolic representations of operations by conventional computer. The processes and operations performed by the computer include the manipulation of signals by a processor and the maintenance of these signals within data sets or data structures resident in one or more memory storage devices. These symbolic representations are the means used by those skilled in the art of computer programming and computer construction to most effectively convey teachings and discoveries to others skilled in the art. For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to representations of these signals as bits, bytes, words, information, elements, symbols, nodes, numbers, points, data, entries, objects, images, files or the like. It should be kept in mind, however, that these and similar terms are associated with appropriate physical quantities for computer operations, and that these terms are merely conventional labels applied to physical quantities that exist within and during operation of the computer.

It should be understood that manipulations within the computer are often referred to in terms such as creating, adding, comparing, editing, receiving, determining, grouping, storing, selecting, incrementing, and the like, which are often associated with manual operations performed by a human operator. The operations described herein are machine operations performed in conjunction with various inputs provided by a human operator or user that interacts with the computer.

In addition, it should be understood that the programs, processes, methods, etc. described herein are not related or limited to any particular computer or apparatus, nor are they related or limited to any particular communication architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and a suitable operating environment will be described.

The Exemplary Operating Environment

FIG. 1 and the following discussion are intended to provide a brief, general description of the suitable computing environment in which the invention may be implemented. While the invention will be described in the general context of an application program that runs on an operating system in conjunction with a personal computer, those skilled in the art will recognize that the invention may also be implemented in combination with other program modules. Generally, program modules include routines, programs, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communication network. In a distributed computing environment, program modules may be located in both local and remote memory storage devices.

Referring now to FIG. 1, an exemplary system for implementing the present invention includes a conventional personal computer 20, including a processor 21, a system memory 22, and a system bus 23 that couples the system memory 22 to the processor 21. The system memory 22 includes read only memory (ROM) 24 and random access memory (RAM) 25. A basic input/output system 26 (BIOS) is stored in ROM 24. The BIOS 26 essentially contains the basic routines that help to transfer information between elements within the personal computer 20 during certain computer operations, such as during start-up. The personal computer 20 further includes a hard disk drive 27, a magnetic disk drive 28 (e.g., that reads from and writes to a removable disk 29), and an optical disk drive 30 (e.g., that reads from a CD-ROM disk 31 or reads from or writes to other optical media). The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage for the personal computer 20. Although the description of computer-readable media above includes the hard disk drive 27, a removable magnetic disk 29 and an optical disk 31, such as a CD, it should be appreciated by those skilled in the art that other types of media which are readable by a computer, such as magnetic cassettes, flash memory cards, digital video disks and tapes, Bernoulli cartridges, and the like, may also be used in the exemplary operating environment.

A number of program modules may be stored in the drives and RAM 25, including an operating system 35, one or more application programs, such as the publishing program module 36, other program modules 37, and program data 38. In the preferred embodiment of the present invention, examples of program data 38 include a document file containing objects arranged in a particular layout, data structures used when creating the HTML table, and an HTML file containing elements defining the layout and content of the HTML table. These examples of the program data 38 are discussed in greater detail below with regard to FIG. 6.

The operating system 35, in conjunction with the BIOS 26 and associated device drivers, provides the basic interface between the computer's hardware and software resources, the user, and program modules such as the publishing program module 36. A user may enter commands and information into the personal computer 20 through a keyboard 40 and an input or pointing device, such as a mouse 42. Other input devices (not shown) may include a microphone, a joystick, a game pad, a satellite dish, a scanner, or the like. These and other input devices are often connected to the processor 21 through a serial port interface 46, such as a game port or a universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote programmable devices, such as a remote computer 49. The remote computer 49 may be a server, a router, a peer device, or other common network node. Typically, the remote computer 49 includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the global Internet.

When used in a LAN networking environment, the personal computer 20 is connected to the local network 51 through a network interface 53. When used in a WAN networking environment, the personal computer 20 typically includes a modem 54 or other means for establishing communications over the wide area network 52, such as the global Internet. The modem 54, which may be internal or external, is connected to the system bus via the serial port interface 46. In a networked environment, program modules depicted relative to the personal computer 20, or portions thereof, may be stored in the remote memory storage device 50. It will be appreciated that the network connections show are exemplary and other means of establishing a communications link between the personal computer 20 and the remote computer 49 may be used.

As discussed earlier, the preferred embodiment of the present invention is embodied in the preferred publishing program module 36, which is designed to operate in conjunction with Microsoft Corporation's "WINDOWS 95" or "WINDOWS NT" operating systems. However, it should be understood that the invention can be implemented for use with other operating systems, such as Microsoft Corporation's "WINDOWS 3.1" operating system, IBM Corporation's "OS/2" operating system, SunSoft's "SOLARIS" operating system used in workstations manufactured by Sun Microsystem, Hewlett-Packard's "HPUX" operating system, and the operating system used in "MACINTOSH" computers manufactured by Apple Computer, Inc.

From this brief description, it should be appreciated that operating systems, such as the "WINDOWS 95" and "WINDOWS NT" operating system, are quite complex and provide a wide variety of services that allow users and programs to utilize the resources available in the personal computer. Those skilled in the art will be familiar with operating systems and their various features. For more comprehensive information regarding the "WINDOWS 95" and "WINDOWS NT" operating system and its interaction with programs, the reader may refer to any of a variety of publications, including the "Win32 Programmer's Reference" and "Advanced Windows", both published by Microsoft Press.

Likewise, those skilled in the art will appreciate that the preferred publishing program module 36 provides a wide variety of features and functions in addition to those included in the brief description presented above.

HTML Background

As mentioned earlier, HTML is a scripting-type language that defines the content of hypertext-enabled documents. HTML defines the syntax and placement of embedded directions or HTML elements, that are not displayed by browsing software (i.e., software that interprets the HTML elements). These HTML elements tell the browsing software how to display the contents of the hypertext-enabled document, including text and images by defining and affecting a discrete region of the hypertext-enabled document. Generally, the hypertext-enabled document will have HTML elements, preferably called tags or attributes, defining the head of the document (<HEAD> . . . </HEAD>) and the body of the document (<BODY> . . . </BODY>). Typically, the title of the hypertext-enabled document is defined within the head of the document using a <TITLE> . . . </TITLE>tag. However, the body of the document usually contains the main substance of the document, such as an HTML table defined by an HTML table element, preferably designated by a <TABLE> . . . </TABLE>tag. The table created by the publishing program module 36 represents the layout of objects and is preferably one such HTML table.

An HTML table is an HTML standard element which is laid out in rows and columns of cells, similar to a conventional spreadsheet. Basically, each cell in the table contains data or cell content, preferably in the nature of HTML code elements. For a particular cell, the data or content may be empty. The layout and content of the cells in a table are defined from left to right and top to bottom, according to a convention defined by HTML 2.0 with the Netscape Extensions. Examples from the preferred embodiment of such content of a cell may include empty space, the text of one of the objects on the page, or an image of one or more overlapping objects on the page. Essentially, HTML uses images, such as the image of one or more overlapping objects, for content as if the image was some kind of special large character. According to this sequential-type of definition of each cell according to the rows and columns, the HTML elements are emitted into a stream in a specific order that defines the layout and content of each cell in the table. This stream is generally stored in an HTML file that maintains the hypertext-enabled document.

One of the hallmark features of HTML is the ability to define hypertext links (hyperlinks). Hyperlinks give the user the ability to seemlessly retrieve and display a different document that resides at a unique address (called a universal resource locator or URL) on the computer network, such as the Internet. In the preferred embodiment, the HTML element or tag <A> is an anchor defining the URL of the linked document. This anchor appears in the HTML stream of elements relative to where the hyperlink is to appear.

As previously mentioned, hyperlinks within hypertextenabled documents can be represented as highlighted text. For example, a hyperlink to "http://www.warren.microsoft.com" may be represented by the highlighted text string of "Warren's World." The HTML code element for this hyperlink may appear as:

<A HREF="http://www.warren.microsoft.com"> Warren's World </A>

However, hyperlinks can also be represented by images, preferably using the <IMG> tag embedded within the <A> tag. If the entire image is designated as the hyperlink, clicking any area of the image will activate the hyperlink and the user will access the linked document. Taking this one step further, different parts or regions of the image may be designated as different hyperlinks. Thus, a single image may have several regions, each representing a different hyperlink.

In light of the above discussion discussion of HTML code elements and hyperlinks, those skilled in the art will recognize that there are many more complex features within HTML. Additional information about HTML is available in "HTML: The Definitive Guide" by Chuck Musciano and Bill Kennedy, published by O'Reilly & Associates, Inc.

The Publishing program module

Figure 5:
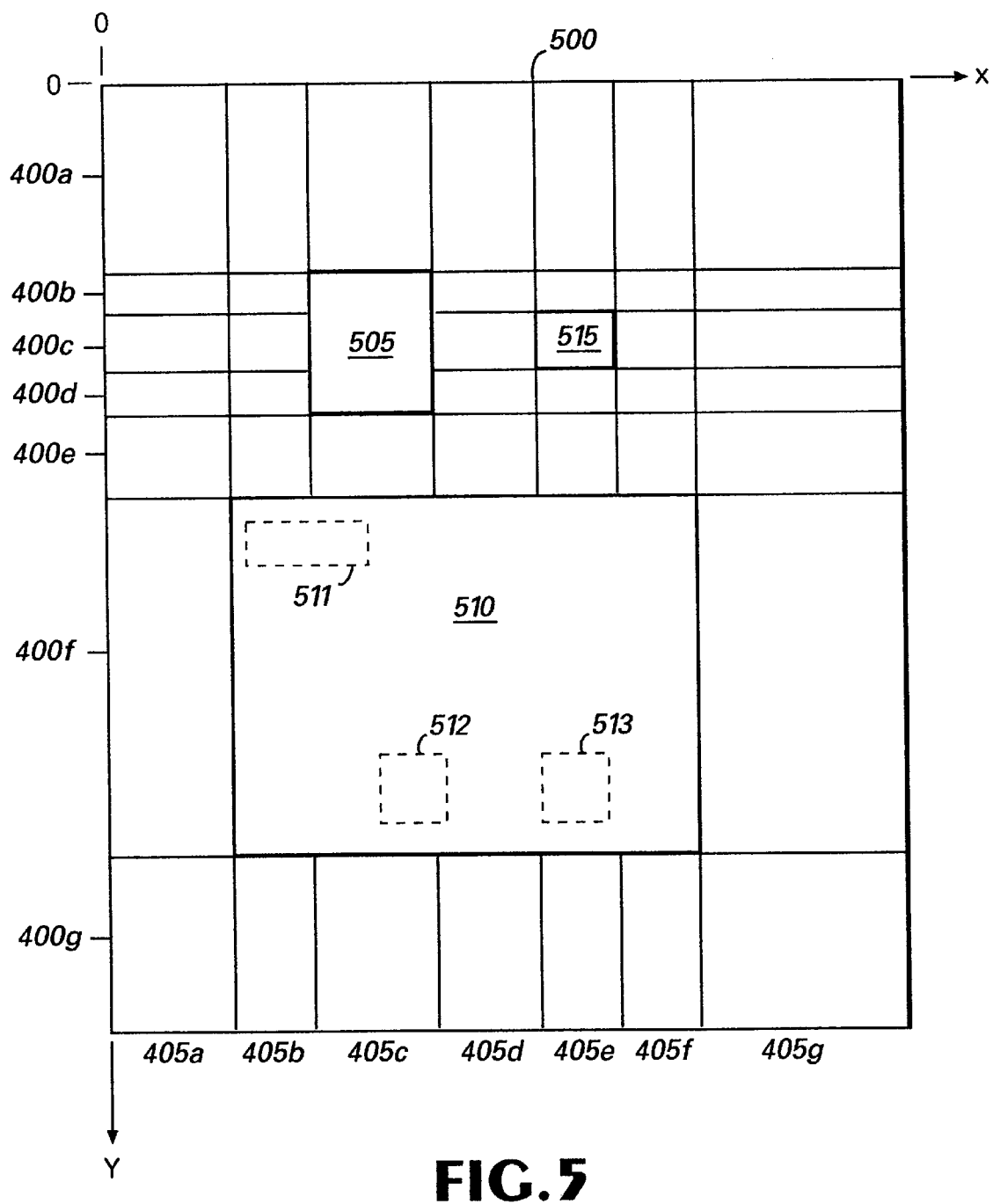
FIG. 5 is a diagram illustrating a layout of a table defined by a framework with new merged cells representing the overlap groups.
Figure 6:
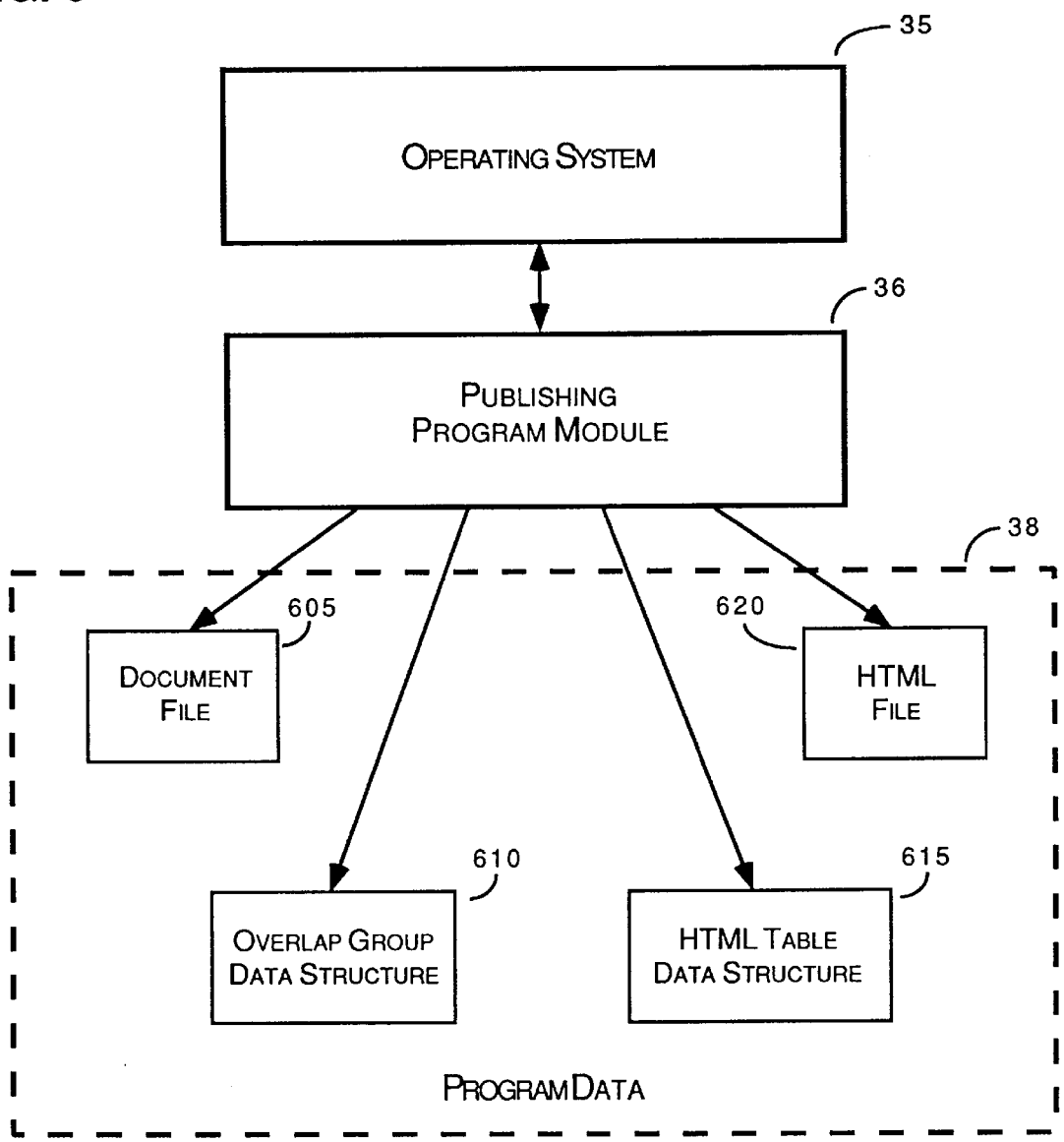
FIG. 6 is a diagram illustrating the interaction between the preferred publisher program and program data, such as a document file, an overlap group data structure, an HTML table data structure, and an HTML file.
Figures 7, 8:
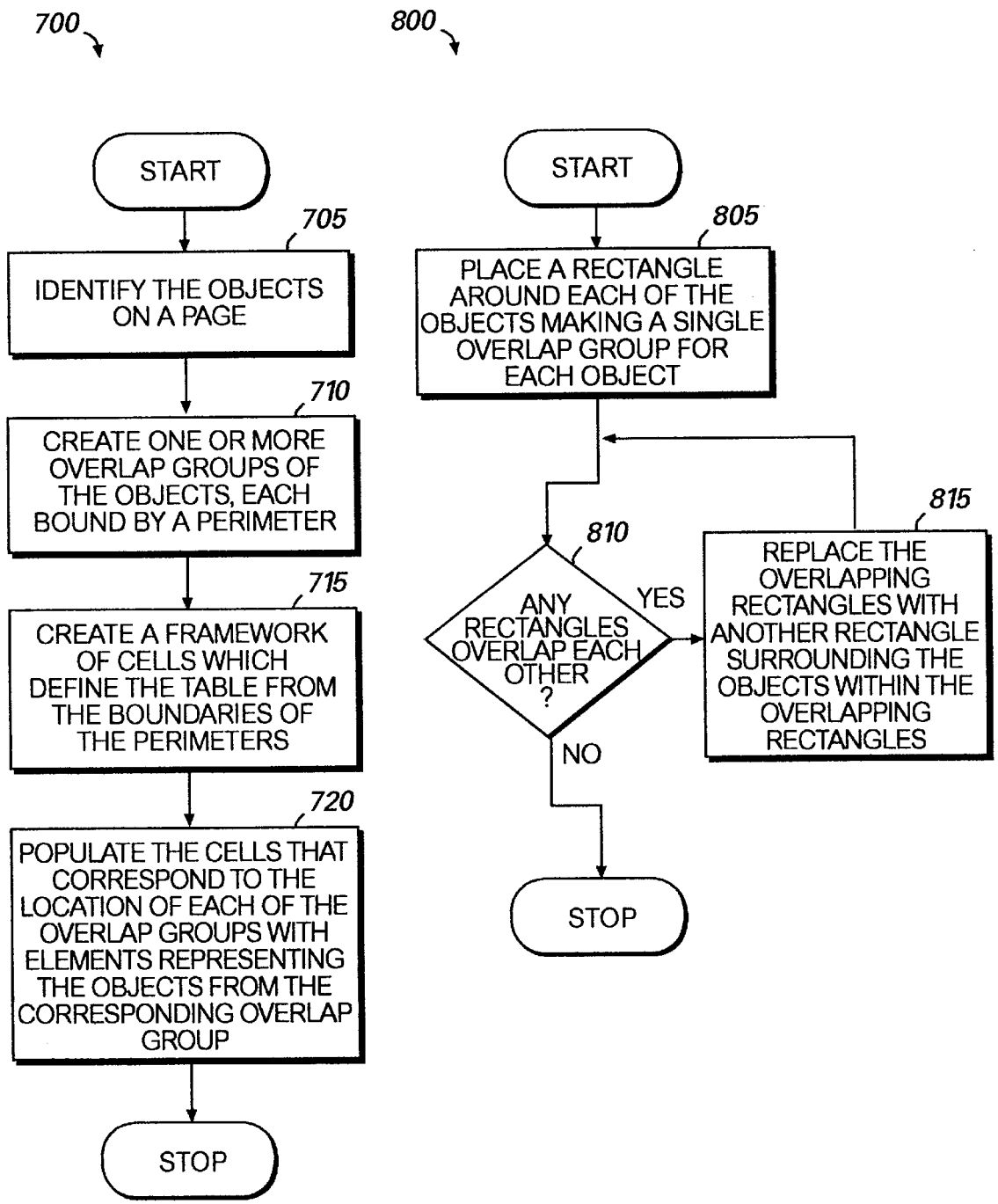
FIG. 7 is a flow diagram illustrating the preferred steps for creating a table from a layout of objects on a page.
FIG. 8 is a flow diagram illustrating the preferred steps for grouping objects that are in a layout on a page into overlap groups.

Given the above preface on the operating environment and HTML in general, the preferred embodiment of the present invention is described. FIGS. 2–5 are diagrams that graphically illustrate how the layout of a table, such as an HTML table, is created from overlap groups of objects arranged in a layout on a page. FIG. 6 is a diagram illustrating the interaction between the preferred publisher program, a document file, an overlap group data structure, an HTML table data structure, and an HTML file. FIGS. 7–9 are flow diagrams illustrating the preferred steps for creating an HTML table from a layout of objects on a page. FIG. 10 is a flow diagram illustrating the preferred steps for preserving existing hyperlinks associated with objects on a page when creating the HTML table. FIGS. 11–13 are diagrams illustrating text adornments associated with an object and a flow diagram of the preferred steps for using a nested HTML table to provide such text adornments to objects represented within a single cell of a table.

Figure 2:
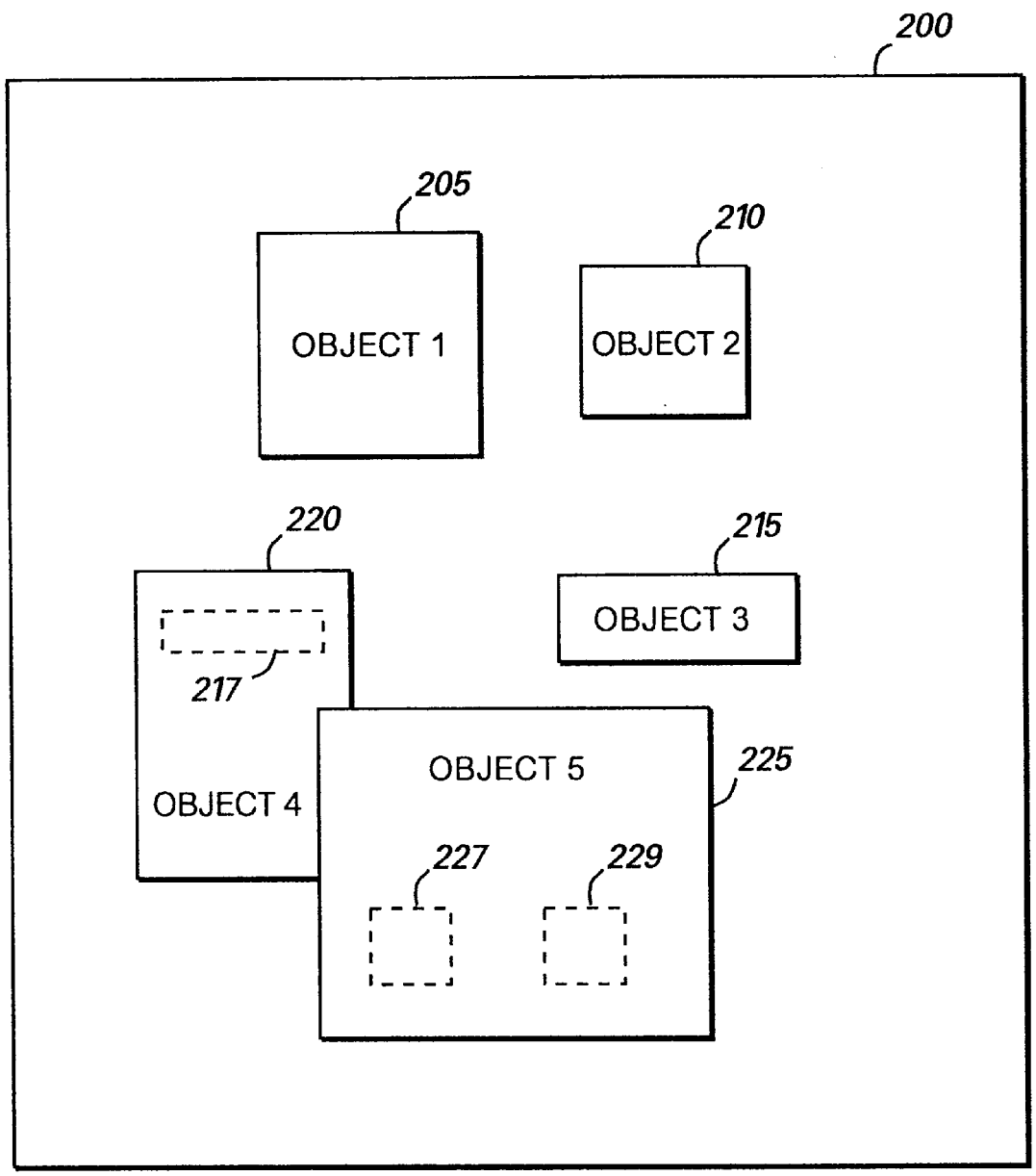
FIG. 2 is a diagram illustrating objects in a layout on a page.

FIG. 2 is a simple diagram illustrating objects in a layout on a page. Referring now to FIG. 2, the page 200 is preferably produced by the publishing program module 36. The page 200 is a single document page, as would be printed out in a conventional manner. For example, the page 200 could be one page of a traditional printed newsletter prepared by the publishing program module 36.

The "layout" of objects is essentially the arrangement of each of the objects (such as Object 1 205, Object 2 210, Object 3 215, Object 4 220, Object 5 225) on the page 200. Object 1 205, Object 2 210, and Object 3 215 do not touch each other as laid out on the page 200. However, Object 4 220 and Object 5 225 visibly touch and overlap each other. This is typically done to add an artistic effect Having overlapping objects, as shown on the page 200, makes it difficult to create an online version of the page 200 that preserves the layout of the objects 205–225 using the solutions in the prior art. Although each of the objects appear as rectangular shaped or framed objects in FIG. 2, the present invention should not be limited to rectangular objects. The objects 205–225 could be any kind of polygon shape or curved shape. The objects 205–225 appear within FIG. 2 as rectangular objects merely to simplify the description of the preferred embodiment of the present invention.

Object 4 220 and Object 5 225 each have hyperlinks associated with them. Object 4 220 has one hyperlink 217 associated with it located over a top region of Object 4 220. For example, if the content of Object 4 220 is merely text, then the hyperlink 217 associated with Object 4 220 represents the text in the top portion of Object 4 220.

Object 5 225 has two distinct hyperlinks 227, 229 located over a left-hand region of Object 5 225 and over a right-hand region of Object 5 225, respectively. For example, if the content of Object 5 225 is an image, then the hyperlinks 227, 229 represent particular regions, preferably called hot regions, of the image.

Figure 3:
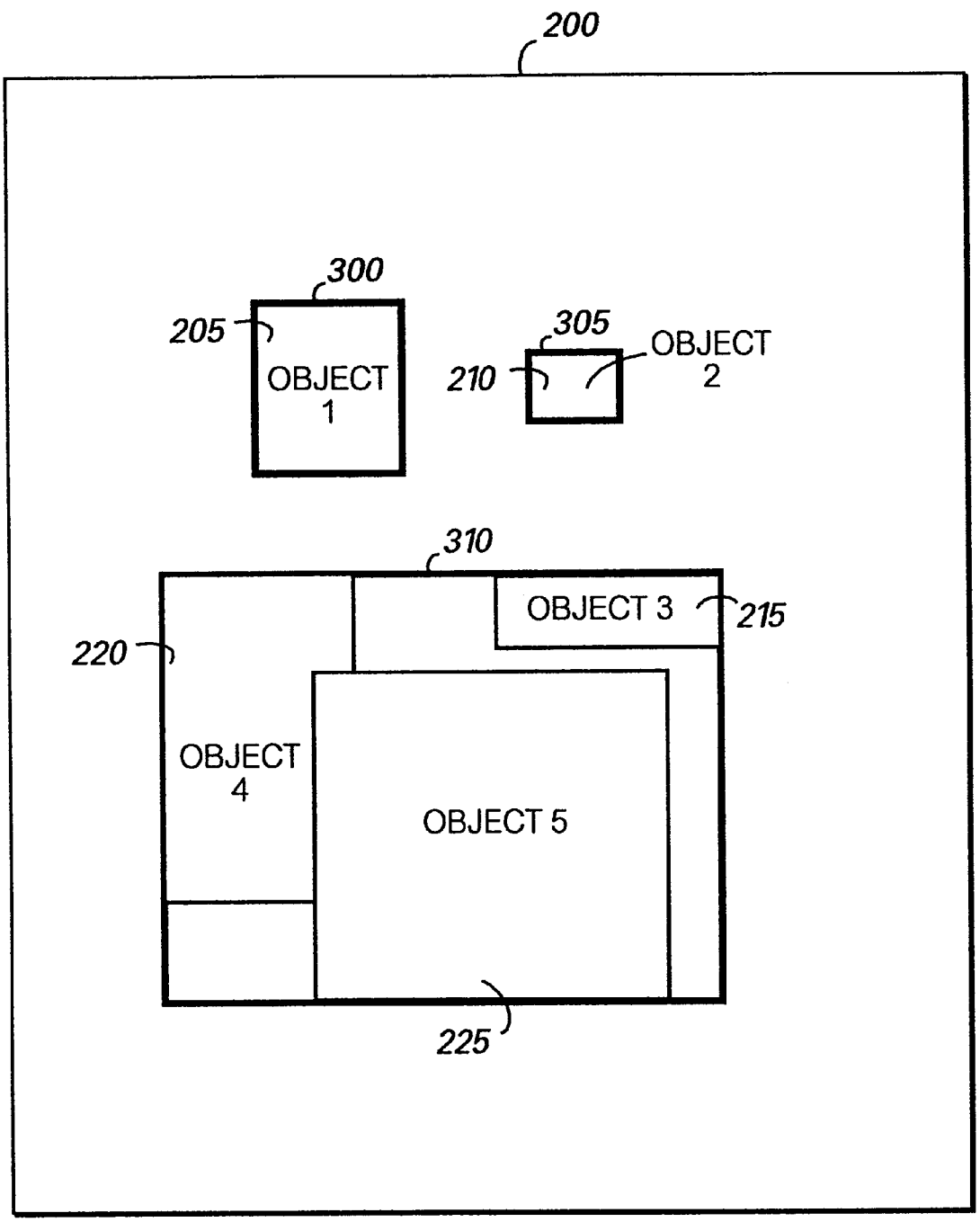
FIG. 3 is a diagram illustrating overlap groups of the objects on the page bound by non-overlapping rectangles.

FIG. 3 is a diagram illustrating special groupings of the objects on the page, called overlap groups. Referring now to FIGS. 2 and 3, the objects 205–225 are grouped into the overlap groups bound by rectangles 300–310 after all of the objects are identified on the page 200. Essentially, each overlap group is bound by a rectangle 300–310 (more generally referred to as a perimeter) and contains objects that, as a group, do not overlap any other overlap group. The focus of overlap groups is to have groups of objects that can overlap and to have none of the overlap groups overlapping each other.

For example, Object 4 220 and Object 5 225 overlap each other because rectangles encompassing each object would intersect. Thus, Object 4 220 and Object 5 225 together may be an overlap group. A rectangle encompassing the combination of Object 4 220 and Object 5 225 would then overlap Object 3 215. However, a rectangle 310 encompassing the combination of Object 4 220, Object 5 225, and Object 3 215 does not overlap any other non-overlapping objects on the page 200. In other words, the rectangle 300 encompassing Object 1 205 does not overlap the rectangle 305 encompassing Object 2 210, neither of which overlap the rectangle 310 around a group of the rest of the objects (Object 3 215, Object 4 220, and Object 5 225).

Thus, the objects within each of these non-overlapping rectangles 300–310 are grouped together into groups called overlap groups. This effectively divides the space on the page 200 into three non-overlapping regions (overlap groups) containing the content and layout of the page 200 (i.e., the objects 205–225 as laid out on the page 200).

Although FIG. 3 illustrates perimeters, such as rectangles 300–310, bounding each overlap group, it is contemplated that any type of perimeter will suffice that defines a region within the perimeter (preferably called an overlap region) and that has left, right, top, and bottom boundaries. These boundaries can be the coordinates of the respective left, right, top and bottom parts of the perimeter. Another example of boundaries are horizontal lines through the top-most and bottom-most parts of the perimeter and vertical lines through the left and right-most parts of the perimeter.

Figure 4:
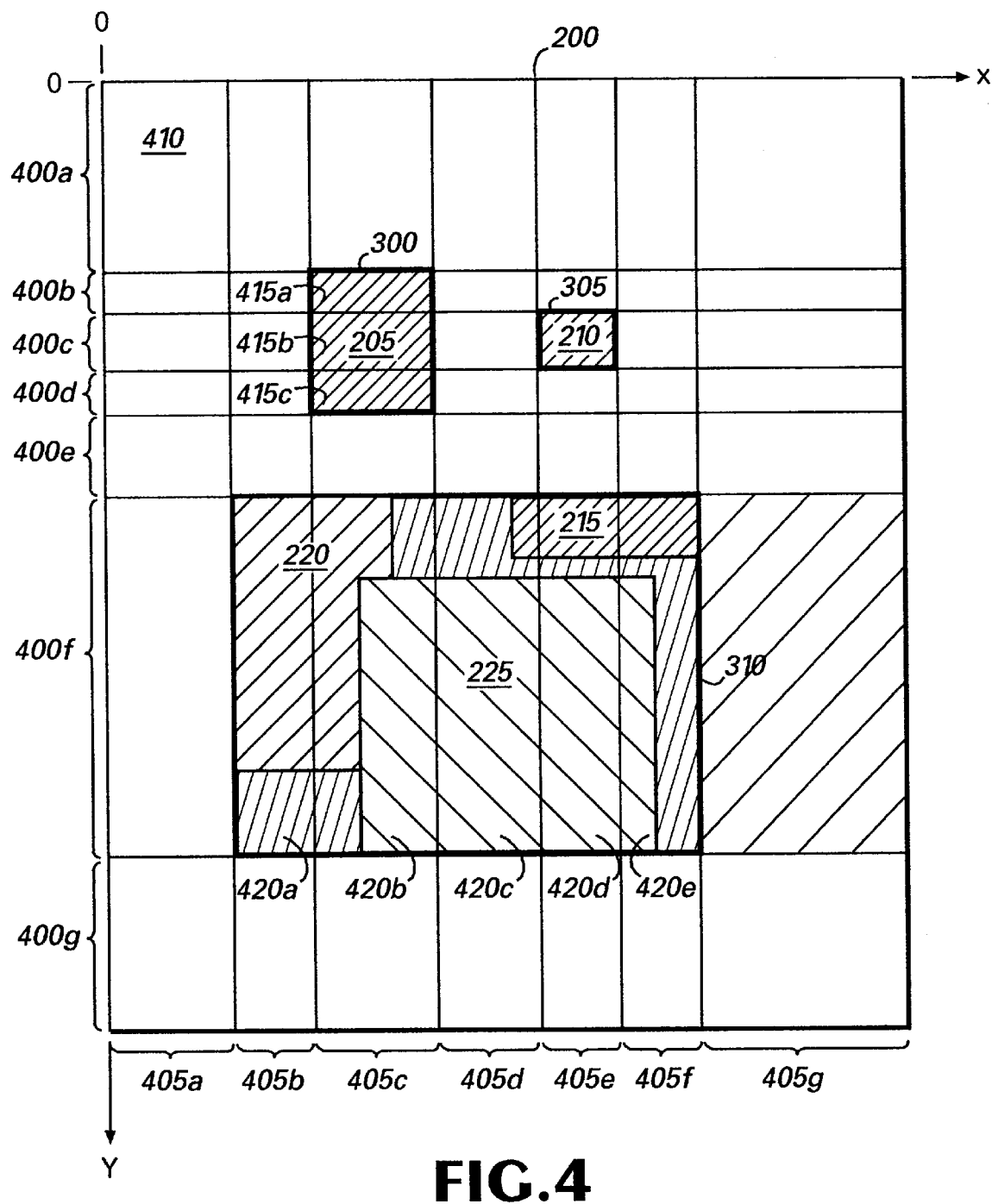
FIG. 4 is a diagram illustrating a framework of cells defined by the bounding coordinates of the non-overlapping rectangles surrounding each of the overlap groups.

FIG. 4 is a diagram illustrating how the non-overlapping rectangles 300–310 around the overlap groups help to define the layout for the HTML table. Referring now to FIGS. 1–4, an x-y coordinate system has been overlaid onto the page 200 as a reference. The boundaries (top, bottom, left-side, and right-side) of each non-overlapping rectangle 300–310 (perimeter) define horizontal and vertical lines that essentially break up the page 200 into a framework of rows 400a–g and columns 405a–g. At the intersection of a row 400a and a column 405a is a cell 410. The layout or arrangement of the framework, i.e., the size and location of each cell, is defined by the position of the rows 400a–g and columns 405a–g. Thus, the publishing program module 36 uses the boundaries of the non-overlapping rectangles 300–310 or, more particularly, the bounding coordinates of each non-overlapping rectangle 300–310 around each overlap group to determine the desired layout for the HTML table.

At this stage, some of the non-overlapping rectangles 300, 310 may be intersected by the horizontal or vertical lines. This occurs when one of the vertical boundaries of a non-overlapping rectangle is directly above or below another non-overlapping rectangle or when one of the horizontal boundaries of a non-overlapping rectangle is directly to the left or right of another non-overlapping rectangle. In such a situation, the region (preferably called an overlap region) within the intersected non-overlapping rectangle is covered by more than one cell.

In one example, the rectangle 300 around the overlap group containing Object 1 205 has two horizontal lines intersecting it. These horizontal lines corresponding to the top and bottom boundaries of the rectangle 305 around Object 2 210. By intersecting the rectangle 300 around the overlap group containing Object 1 205, the overlap region within the rectangle 300 is covered by three distinct cells 415a–c.

In another example, the rectangle 310 around the overlap group containing the combination of Object 3 205, Object 4 220, and Object 5 225 has several vertical lines intersecting it. These vertical lines corresponding to the left and right boundaries of the other non-overlapping rectangles 300, 305. By intersecting the rectangle 310 around the overlap group containing the combination of objects 215–225, the overlap region within the rectangle 310 is covered by several distinct cells 420a–e.

The publishing program module 36 then merges cells covering the region of the overlap group into a new cell in order to have a single cell within the framework corresponding to each overlap group. FIG. 5 is a diagram illustrating a layout of a table defined by the framework of cells with new merged cells corresponding to the overlap groups.

Referring now to FIGS. 1, 2, 4, and 5, the layout or arrangement of the table 500 is illustrated with cells in the framework of rows 400a–g and columns 405a–g. Because there were no horizontal or vertical lines intersecting the rectangle 305 around the overlap group with Object 2 210, the cell 515 corresponding to this overlap group did not need to be merged with any other cell within the framework. However, this is not the situation with the other overlap groups where the publishing program module 36 merges cells to encompass each of the overlap regions of the respective overlap groups.

The cells 415*a*–*c* which cover the rectangle 300 around the overlap group containing Object 1 205, as illustrated in FIG. 4, are merged to form a single new merged cell 505 for the overlap group containing Object 1 205. Thus, all of the overlap region of the overlap group containing Object 1 205 is covered by the merged cell 505. Similarly, all of the cells 420*a*–*e* which cover the rectangle 310 around the overlap group containing the combination of objects (Object 3 205, Object 4 220, and Object 5 225), as illustrated in FIG. 4, are merged to form a single new merged cell 510 for the overlap group containing the combination of objects.

In another aspect of the present invention, the publishing program module 36 is capable of preserving an existing hyperlink by creating an image map relative to the overlap group containing the object having the existing hyperlink. As previously mentioned, Object 4 220 and Object 5 225 each have existing hyperlinks associated with them. Object 4 220 has one hyperlink 217 associated with it located over a top region of Object 4 220. Object 5 225 has two distinct hyperlinks 227, 229 located over a left-hand region of Object 5 225 and over a right-hand region of Object 5 225, respectively. The image map essentially provides the location or "hot region" associated with the existing hyperlink relative to the location of the object within the overlap group. Clicking on a hot region using the mouse 42 activates the existing hyperlink to another linked document. If more than one existing hyperlink is associated with objects within a single overlap group, the publishing program module 36 is able to include corresponding hot regions for each existing hyperlink within the single overlap group.

An image map may be used with the image to preserve a link to the image. The image map is typically specified by a hyperlink element. However, the hyperlink element may link the image itself when the image is the only object in the overlap group. Therefore, using image and image maps in this way preserves the existing hyperlinks associated with the objects 205–225 on the page 200.

For example, the publishing program module 36 is able to preserve the existing hyperlinks 217, 227, 229 associated with the combination of objects (Object 3 205, Object 4 220, and Object 5 225) within the overlap group in the new merged cell 510. Basically, the publishing program module 36 would emit an image map with an image of the combination of objects. More particularly, an image would be emitted with defined hot regions relative to the top left of the overlap region image within the new merged cell 510. A top hot region 511 of the image map for the new merged cell 510 would correspond to the existing hyperlink 217 at the top region of Object 4 220. Additionally, two other hot regions 512, 513 would respectively correspond to the two distinct hyperlinks 227, 229 located over a left-hand region of Object 5 225 and over a right-hand region of Object 5 225. In this manner, the existing hyperlinks can be preserved by the publishing program module 36 when creating the HTML table 500. The present invention should not be limited to hot regions 511–513 appearing to cover only a part of the new merged cell 510, as illustrated in FIG. 5. It is contemplated that all of the new merged cell 510 and any part thereof may be defined as a hot region and used as a hyperlink. The preferred steps for preserving existing hyperlinks are discussed in greater detail below with regard to FIG. 10.

In summary, the publishing program module 36 defines this table (i.e., the framework of cells preferably called an HTML layout table 500) and populates each cell with the appropriate content by emitting particular HTML elements so that the HTML layout table 500 preserves the WYSIWYG appearance of the objects 205–225 as arranged in the layout on the page 200. A cell may correspond to an overlap group for a single object in the overlap group having rendering characteristics so that the cell may be easily rendered. Such a cell may be defined by emitting HTML native text elements. Representing such an object with HTML native text elements is desirable because HTML native text elements require less memory to maintain and less time to download when compared to HTML image elements representing an image of the single object. Additionally, the text from the HTML native text element can be re-used (i.e., copied or pasted). Furthermore, users of an online version of the page of objects would see the text first because HTML text is conventionally downloaded before HTML images.

Alternatively, if the overlap group has more than one object or has a single object which does not have easy rendering characteristics, the publishing program module 36 may represent the overlap group by emitting an HTML image element. This HTML image element represents the WYSIWYG appearance of the objects in the overlap group as laid out on the page 200. The preferred steps for creating the table 500 from a layout of objects on the page 200 is described in more detail below with regard to FIGS. 7–9.

Interaction with the Program Data

In the preferred embodiment of the present invention, the publishing program module 36 interacts with program data 38 when creating the HTML layout table 500 from the layout of objects 205–225 on the page 200. Understanding the kind of program data 38 used and how this program data 38 is stored is helpful for understanding the present invention. FIG. 6 is a diagram illustrating the interaction between the operating system 35, the preferred publishing program module 36 and program data 38, such as a document file, an overlap group data structure, an HTML table data structure, and an HTML file.

Referring now to FIGS. 1–6, the operating system 3 5 provides the publishing program module 36 with an interface to the computer hardware within the personal computer 20. Signals from devices, such as the keyboard 40, the mouse 42, or the remote computer 32, are detected by the operating system 36 and relayed via conventional messages or processes to the publishing program module 36 when appropriate. In this manner, the operating system 35 provides a link with the actual hardware and other program modules 37 within the personal computer 20.

The publishing program module 36 also interacts with the program data 38. As previously mentioned, the program data 38 relevant to the preferred embodiment of the present invention includes a document file 605 containing objects arranged in a particular layout, data structures 610, 615 used when creating the HTML table, and an HTML file 620 containing elements defining the layout and content of the HTML table.

The publishing program module 36 maintains the objects 205–225 that appear on the page 200 within the document file 605. Essentially, the document file 605 is a conventional container used to maintain a traditional electronic document, such as a newsletter, which is made up of text and graphic objects, such as the objects 205–225 that appear on the page 200 of an exemplary electronic document in FIG. 2. As mentioned above with regard to FIGS. 2 and 3, the publishing program module 36 groups each of the objects on the page into overlap groups and places non-overlapping perimeters (e.g., rectangles) around each of the overlap groups when the user decides to create an online version of the page of the electronic document.

The publishing program module 36 preferably maintains information about an overlap group within the overlap group data structure 610. Thus, for each overlap group, the publishing program module 36 typically maintains a distinct corresponding overlap group data structure 610.

Basically, the overlap group data structure 610 maintains a definition of the bounding rectangle which encompasses the objects in the overlap group preferably by maintaining the bounding coordinates of the bounding rectangle. In other words, the bounding coordinates define the boundaries of the rectangles. The bounding coordinates are essentially the x-y coordinates defining the boundaries of the rectangle. In the preferred embodiment, the bounding coordinates for each rectangle include the top y-coordinate, the left x-coordinate, the right x-coordinate, and the bottom y-coordinate. Additionally, the overlap group data structure 610 maintains the number of objects contained with the overlap group along with a handle to the data within each of these contained objects.

Once the objects from the document file 605 have been grouped into overlap groups by the publishing program module 36, the framework or layout of the HTML table 500 is generated by the publishing program module 36 and stored within the HTML table data structure 615. The HTML table data structure 615 essentially maintains the framework of cells that define the layout or arrangement of the HTML layout table 500. More particularly, in the preferred embodiment, the HTML table data structure 615 maintains an array or plex, preferably called ohplxlv, of x-coordinates that define the vertical lines of the framework of the table 500. These coordinates are the x-coordinates of the bounding coordinates of the non-overlapping bounding rectangle 300–310 encompassing each overlap group on the page 200. The HTML table data structure 615 also maintains an array or plex, preferably called ohplylv, of y-coordinates that define the horizontal lines of the framework of the table 500. These coordinates are the y-coordinates of the bounding coordinates of the non-overlapping bounding rectangle 300–310 encompassing each overlap group.

The HTML table data structure 615 also contains various flags, such as flags that are used by the publishing program module 36 to determine if the height of the current row of the table 500 has already been emitted into the HTML stream or the width of the current column has been emitted into the HTML stream. These flags are used to help minimize the amount of redundant information in the HTML stream.

In an embodiment of the present invention, the x and y bounding coordinates of the non-overlapping rectangles are each added to their respective arrays and duplicates of identical coordinates are removed. The remaining coordinates must also be placed in a specific order, preferably ascending order, within their respective arrays. This is accomplished by the publishing program module 36 before the HTML elements are emitted which define the HTML layout table 500. There is another flag, preferably called fOrdered, in the HTML table data structure 615 that indicates whether the x and y coordinates within the two arrays in the HTML table data structure 615 are in order.

Similar to the overlap group data structure 610, the publishing program module 36 typically maintains a distinct HTML table data structure 615 for each HTML layout table on the page. Normally, there is only one HTML layout table on the page at a time. However, the situation where multiple HTML table data structures 615 may be maintained by the publishing program module 36 occurs when there is a nested HTML layout table, such as when an HTML layout table is used to provide adornments such as margins, shadows, or borders to an individual cell of a larger HTML layout table. Adornments using nested HTML layout tables are described in greater detail below with regard to FIGS. 11 and 12.

After the HTML table data structure 615 is created in memory the publishing program module 36 reads the HTML table data structure 615 and the overlap group data structure 610 and emits HTML elements into an HTML stream, which is preferably stored in an ASCII text format in the HTML file 620. Essentially, these elements characterize both the layout and content of each cell within the table, such as the HTML layout table 500. In the preferred embodiment, examples of such elements include, but are not limited to, table elements, row elements, empty cell elements, HTML native text elements, HTML image elements, HTML hyperlink elements, and other conventional tags or attributes that represent the layout and content of the HTML layout table 500. The HTML elements for each cell are preferably emitted in a conventional HTML order when defining a conventional HTML table. This order dictates that HTML elements for the cells are emitted first by row (beginning at the top row) going across the columns of each row.

If there are no objects present within the region defined by a cell, the publishing program module 36 emits an empty cell. In the preferred embodiment, the publishing program module 36 merges consecutively empty cells into a single empty cell as an optimization in order to reduce the size of the HTML file 620.

Additionally, the publishing program module 36 has been optimized to determine if the row height or column span has already been defined for cells in a particular row or column, respectively. If so, the publishing program module 36 does not emit these layout details again, thus further reducing the size of the HTML file 620.

In summary, the publishing program module 36 uses a layout of objects on a page, which are stored within the document file 605, to create two kinds of data structures, the overlap group data structure 610 and the HTML table data structure 615. The overlap group data structure 610 defines the content of the HTML layout table 500 while the HTML table data structure 615 defines the arrangement of cells within the HTML layout table 500. The publishing program module 36 references each of these data structures 610, 615 during the process of emitting HTML elements into the HTML stream, which is stored in the HTML file 615, that creates the HTML layout table 500.

Creating the HTML Layout Table

In an embodiment of the present invention, the publishing program module 36 uses a particular method or process to create an HTML layout table from a layout of objects on a page that preserves the layout of the objects and preserves any existing hyperlinks that are associated with each object. FIG. 7 is a flow diagram that illustrates the preferred steps for creating a table from a layout of objects on a page.

Referring now to FIGS. 2–7, the preferred method 700 begins at step 705 where the objects on a page, such as the Object 1 205 through Object 5 225 in FIG. 2, are identified. Typically, these objects 205–225 appear on the page 200 and are preferably stored within the document file 605 as encapsulated data objects of text or graphic images.

At step 710, one or more overlap groups of the objects are created and bound by a perimeter, such as the rectangle 300 around the overlap group containing Object 1 205. In general, the perimeter encompasses an overlap group. As previously mentioned, each overlap group is a group of the objects containing one or more objects and that, as a group, do not overlap any other overlap group. In other words, the overlap groups include objects that overlap and have a bounding perimeter (e.g., rectangle) that does not overlap any other perimeter around any other overlap group. Creating such overlap groups effectively divides the space on the page into regions (areas within the non-overlapping perimeter bounding each overlap group) which contain the content and layout of the page. In the preferred embodiment, information related to each overlap group (e.g., the perimeters or rectangles 300–310, the number of objects within the overlap group, and the name of each object within the overlap group) is maintained within an overlap group data structure 610.

At step 715, a framework of cells is created by the publishing program module 36 from the boundaries of the perimeters encompassing each overlap group. As previously mentioned regarding FIG. 4, the boundaries (top, bottom, left-side, and right-side) of the non-overlapping rectangles 300–310 (the perimeters) define horizontal and vertical lines that essentially break up the page 200 into a framework of rows 400a–g and columns 405a–g. At the intersection of a row 400a and a column 405a is a cell 410. The layout or arrangement of the framework, i.e., the size and location of each cell 410, is defined by the position of the rows 400a–g and columns 405a–g. As a result, the publishing program module 36 creates the framework of cells using the boundaries of the non-overlapping rectangles 300–310. Essentially, this framework defines the layout or arrangement of the HTML layout table 500 which the publishing program module 36 preferably maintains within an HTML table data structure 615.

At step 720, the content of each cell in the HTML layout table 500 is established when the publishing program module 36 populates the cells corresponding to the location of each of the overlap groups. These cells are populated with elements, preferably HTML elements, representing objects 205–225 within the appropriate overlap group. The cells that do not correspond to the location of any of the overlap groups are left empty, rather than filling them with a blank image taking up precious memory space and requiring more time when downloading. However, an alternate implementation of the present invention may include such empty images. Thus, the populated cells preserve the layout of objects as they appear on the page 200.

In the preferred embodiment, the publishing program module 36 populates these cells by emitting the appropriate HTML elements into the HTML stream defining the HTML layout table 500, which is then stored in the HTML file 620. The appropriate HTML elements may include HTML native text elements or HTML image elements, each of which represents the overlap region within each overlap group. In this manner, each object within an overlap group closely approximates their WYSIWYG relationship to any other objects within the overlap group and their WYSIWYG relationship to all of the objects in all of the other overlap groups.

By creating the table in this manner, the online version of the page 200 (i.e., the HTML layout table 500 stored in the HTML file 620) preserves the layout of the objects 205–225 as they appear on the page 200 using existing browser technology while avoiding creating a table with poor online downloading performance due to its memory size.

One of the important aspects of the present invention is the use of overlap groups, as stated at step 710, to divide the space on the page 200 into distinct regions that do not overlap. These regions, preferably called overlap regions, contain the content and layout of the page 200. FIG. 8 is a flow diagram illustrating and providing more detail on the preferred steps for grouping objects that are in a layout on a page into overlap groups.

Referring now to FIGS. 1, 2, 3, 7, and 8, the preferred method 800 begins at step 805 where the publishing program module 36 places a rectangle around each of the objects 205–225 on the page 200. For example, Object 3 215, Object 4 220, and Object 5 225 initially would each have a rectangle encompassing them, according to step 805.

In one embodiment, the objects inherently have their own bounding rectangle around them. In this situation, the rectangles may be placed, for purposes of the present invention, by reading the rectangles associated with the objects. However, step 805 of the present invention also contemplates placing rectangles which are not inherently included with the objects.

In the preferred embodiment, each rectangle and its associated object is essentially a single overlap group. The overlap group is preferably designated by the rectangle and an object list. The object list is a single element handle to the object associated with the rectangle.

At step 810, the publishing program module 36 determines if any of the rectangles encompassing the objects 205–225 overlap each other. If so, the step 810 proceeds to step 815. This would be the case for the rectangles encompassing Object 4 220 and Object 5 225 because these two objects actually overlap and touch each other. Otherwise, step 810 proceeds to step 820.

At step 815, the publishing program module 36 replaces the overlapping rectangles with another rectangle. This other rectangle essentially surrounds the objects that were encompassed by the overlapping rectangles. In other words, the two overlapping rectangles are merged into a larger rectangle. Furthermore, the object lists from each of the overlap groups associated with the overlapping rectangles are concatenated. As a result, the two overlap groups are merged into a single overlap group having the replacement rectangle and the concatenated object list of objects associated with the replacement rectangle. Step 815 proceeds back to step 810 after replacing the overlapping rectangles with the merged/replacement rectangle. Essentially, the loop of steps 810–815 continues to reduce the number of overlap groups until there are no more overlapping rectangles on the page 200.

Referring back to the example, there are five initial overlap groups associated with the five objects on the page 200. The rectangle initially placed around Object 4 220 and Object 5 225 are overlapping. Thus, at step 815 another rectangle would replace these overlapping rectangles. However, the publishing program module 36 determines at step 810 that this other rectangle now overlaps the rectangle encompassing Object 3 215 despite the fact that Object 4 220 and Object 5 225 do not visibly touch Object 3 215. Again, another rectangle 310 replaces the overlapping rectangles at step 815 before proceeding back to step 810. At this point in the example, the publishing program module 36 determines at step 810 that none of the remaining rectangles (i.e., the rectangle 300 around Object 1 205, the rectangle 305 around Object 2 210, and the replacement rectangle 310 around the combination of Object 3 215, Object 4, 220, and Object 5 225) overlap each other.

The objects within each of the remaining rectangles define the remaining overlap groups of objects from the page 200. Referring back to the example, one overlap group would contain only Object 1 205 and would have its overlap region defined as the space within the rectangle 300 encompassing Object 1 205. Another overlap group would contain only Object 2 210 and would have its overlap region defined as the space within the rectangle 305 encompassing Object 2 210. A final overlap group would contain Object 3 215, Object 4, 220, and Object 5 225. This final overlap group would have its overlap region defined as the space within the rectangle 310 encompassing the combination of Object 3 215, Object 4, 220, and Object 5 225.

Therefore, the preferred method 800 for grouping objects 205–225 into distinct overlap groups is useful for breaking up the page 200 into particular regions defined by the rectangles 300–310 surrounding each overlap group. This is helpful because the page 200 is essentially re-defined with non-overlapping entities (overlap groups of the objects 205–225) at specific locations on the page 200 instead of with overlapping entities (objects 205–225) on the page 200, which are problematic when creating online versions of the page 200.

Figure 9A:
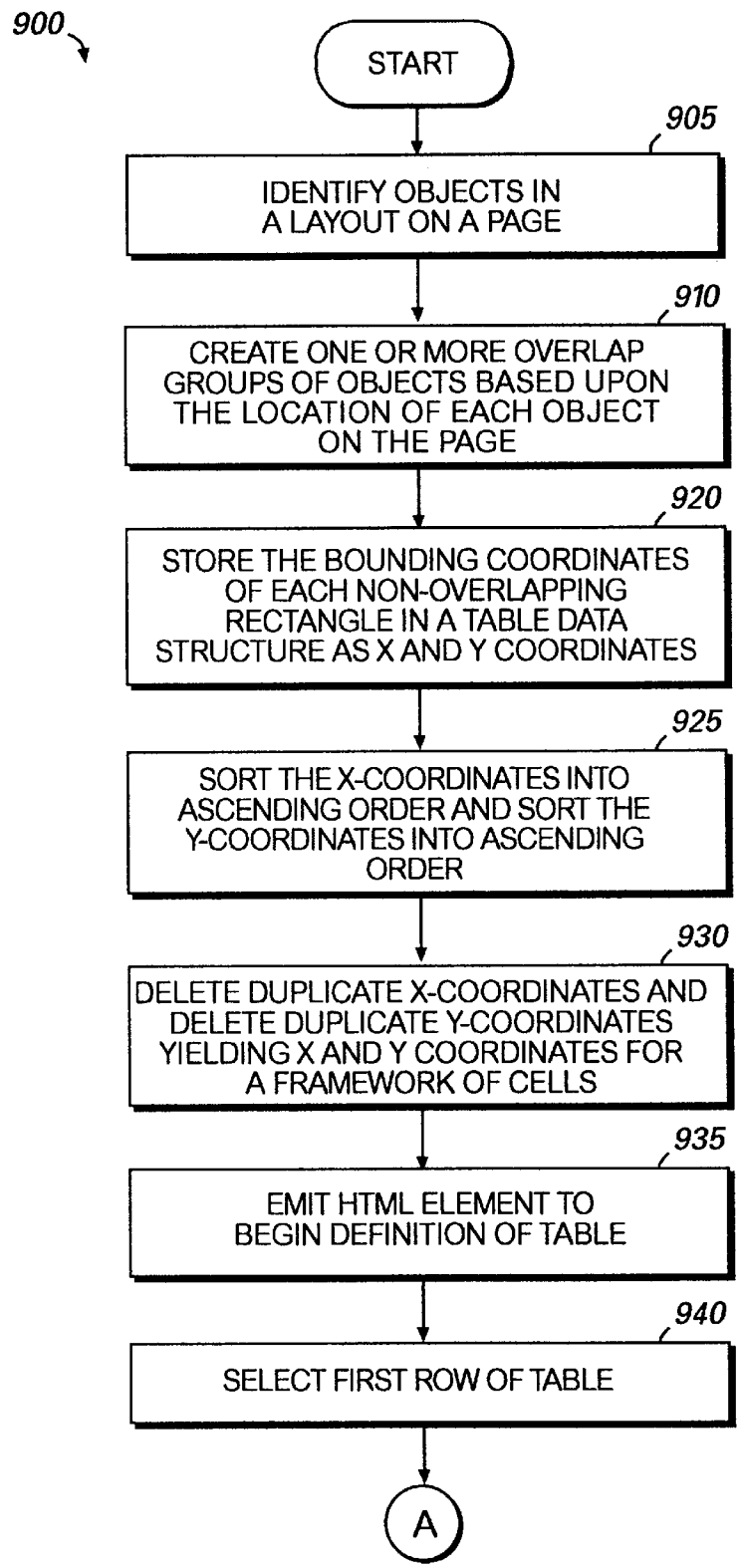
FIG. 9, consisting of FIGS. 9A–C, is a detailed flow diagram illustrating the preferred steps for creating a table from a layout of objects on a page.
Figure 9B:
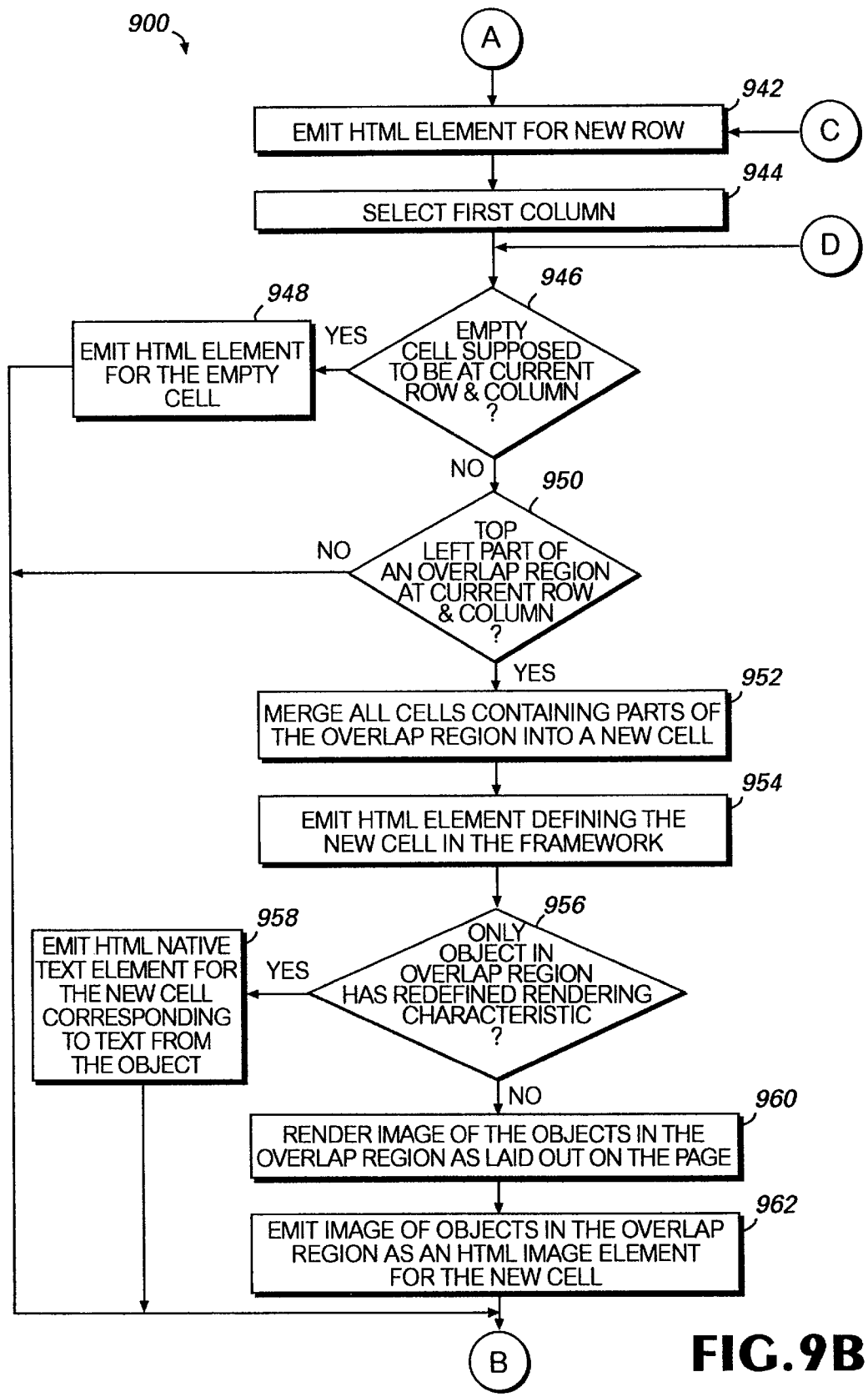
Figure 9C:
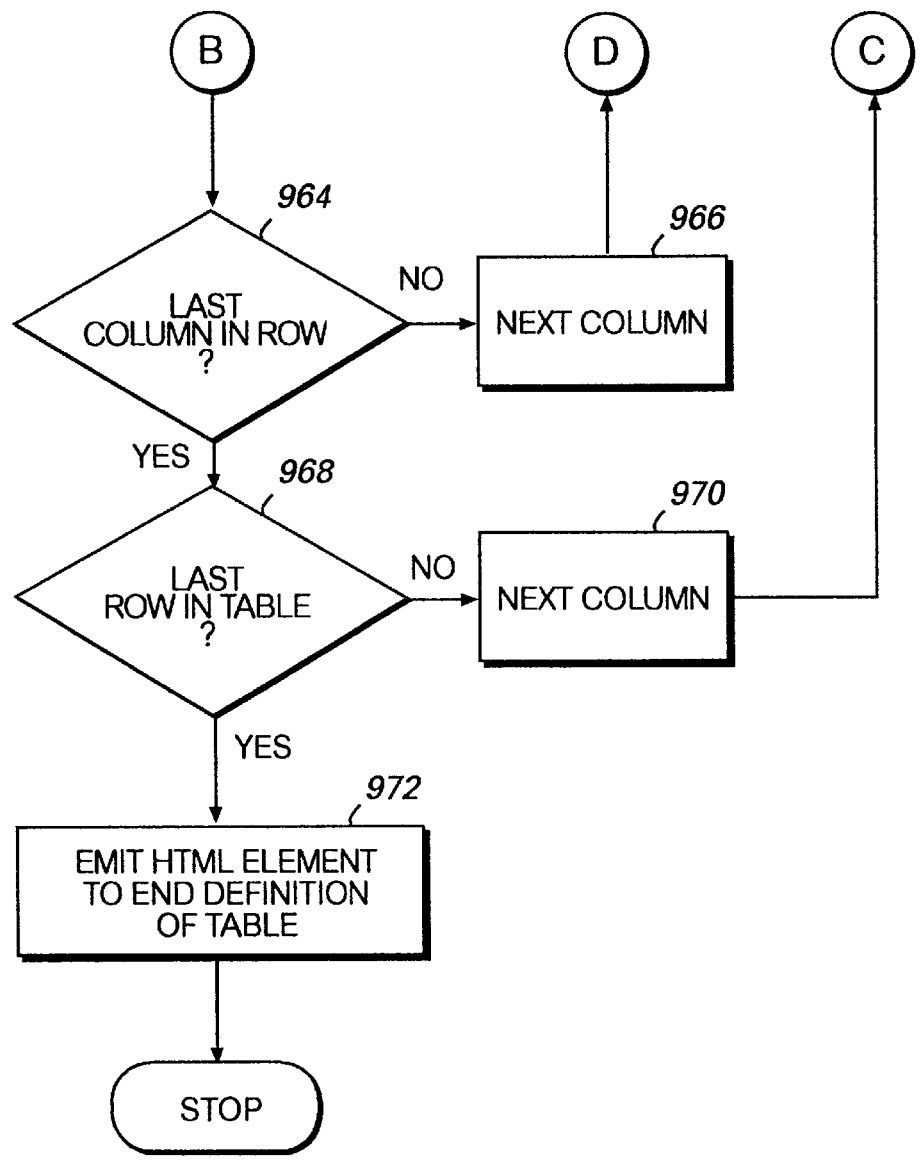
Figure 10:
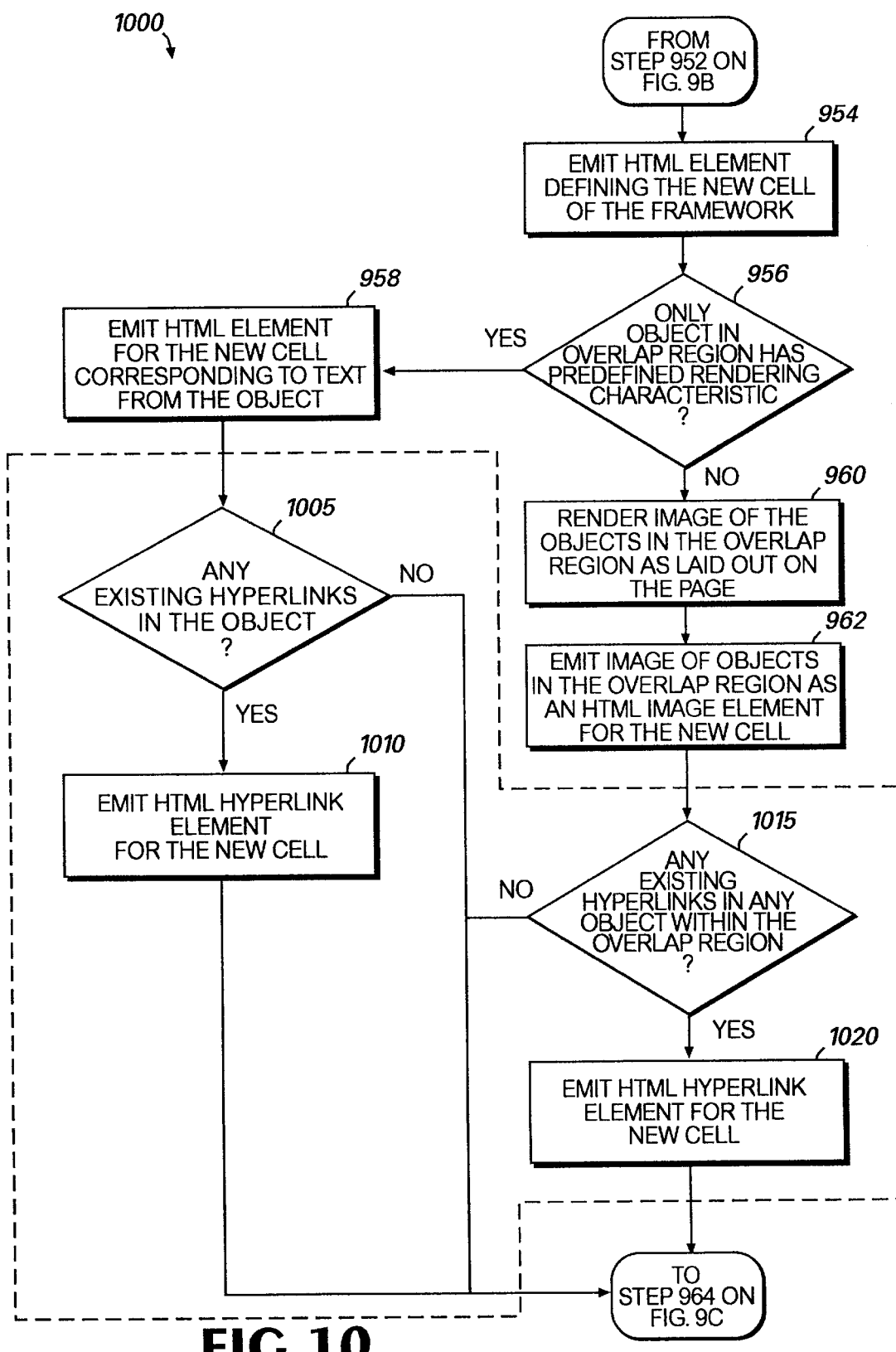
FIG. 10 is a flow diagram illustrating the preferred steps for preserving existing hyperlinks associated with objects when creating a table from a layout of the objects on a page.

FIG. 9, consisting of FIGS. 9A–C, is a detailed flow diagram illustrating the preferred steps for creating a table from a layout of objects on a page. A more detailed description is provide with regards to how the framework of the table 500 is created and how each cell of the table 500 is populated.

Referring now to FIGS. 1, 2, 3, 4, 6, and 9A, the preferred method 900 begins at step 905 where the publishing program module 36 identifies text and graphic objects in a layout on a page of a traditional electronic document, such as a newsletter. For example, the publishing program module 36 would identify Object 1 205 through Object 5 225 appearing on the page 200. The objects, such as the objects 205–225 illustrated in FIG. 2, are maintained within a document file 605.

At step 910, one or more overlap groups of the objects are created based upon the location of each object 205–225 on the page 200. The layout or arrangement of the objects 205–225 relative to each other on the page 200 is predetermined. Thus, the objects are grouped into overlap groups of the objects 205–225, typically using the preferred method 800 described with respect to FIG. 8, where the created overlap groups do not overlap each other.

By definition, each overlap group is bound by a non-overlapping rectangle. An example of such a non-overlapping rectangle is one of the remaining rectangles 300–310 illustrated on FIG. 3 and further described with regard to FIG. 8. At this step, the publishing program module 36 stores information regarding each overlap group within an overlap group data structure 610 for that particular overlap group. In the preferred embodiment, this information includes the bounding coordinates of the non-overlapping rectangle bounding the overlap group, the number of objects within the overlap group, and the name of each object within the overlap group. The bounding coordinates are essentially the x-y coordinates defining the boundaries of the rectangle. In the preferred embodiment, the bounding coordinates for each rectangle include the top y-coordinate, the left x-coordinate, the right x-coordinate, and the bottom y-coordinate.

At step 920, the publishing program module 36 reads the x-coordinates of the boundary coordinates of each of the non-overlapping rectangles from each overlap group data structure 610 and stores these x-coordinates within the HTML table data structure 615 (table data structure). These x-coordinates are used to define the spacing of the columns in the framework of the table 500. In the preferred embodiment, these x-coordinates are stored within the ohplxlv array in the HTML table data structure 615.

Similarly, the publishing program module 36 reads the y-coordinates of the bounding coordinates of each of the non-overlapping rectangles from each overlap group data structure 610 and stores these y-coordinates within the HTML table data structure 615. These y-coordinates are used to define the spacing of the rows in the framework of the table 500. In the preferred embodiment, these y-coordinates are stored within the ohplylv array in the HTML table data structure 615. Thus, the HTML table data structure 615 contains all of the x-coordinates and y-coordinates of the bounding coordinates for the rectangles in each overlap group.

At step 925, the publishing program module 36 sorts the x-coordinates stored within the HTML table data structure 615 into ascending order and sorts the y-coordinates stored within the HTML table data structure 615 into ascending order. In this manner, the x-coordinates are preferably maintained in an order from low to high values within the ohplxlv array and the y-coordinates are particularly maintained in an order from the low to high values within the ohplylv array. The coordinates require sorting because the publishing program module 36 utilizes these coordinates in ascending order when defining the HTML stream stored in the HTML file 620 which characterizes the HTML layout table 500. In order to signify that ordering of the coordinates has taken place, the publishing program module 36 sets the fOrdered flag after each array of coordinates has been ordered and is ready for further use. One skilled in the art will realize that there may be duplicate coordinates in each array.

At step 930, the publishing program module 36 deletes the duplicate x-coordinates and the duplicate y-coordinates from the HTML table data structure 615, preferably from within the ohplxlv array and the ohplylv array, respectively, in the HTML table data structure 615. Thus, what is left within the x-coordinate array and the y-coordinate array in the HTML table data structure 615 are ordered lists of coordinates that define the unique boundaries of the columns (via the remaining ordered x-coordinates) and the boundaries of the rows (via the remaining ordered y-coordinates). In other words, the remaining ordered x-coordinates and the remaining ordered y-coordinates define the framework of cells for the HTML layout table 500.

Overall, steps 935–970 describe populating the cells corresponding to the location of each of the overlap groups with the objects 205–225 within the appropriate overlap group. This is preferably accomplished by emitting HTML elements representing the table 500 itself and the cells within the table 500 into an HTML stream. These HTML elements are then stored in the HTML file 620. The HTML elements for each cell are emitted in a conventional HTML order when defining a conventional HTML table. First, the table is preferable defined by emitting: <table border=0 cellpadding=0 cellspacing=0>. Next the order dictates that HTML elements for the cells are emitted first by row (beginning at the top row) going across the columns of each row. These HTML elements characterize the layout and content of the HTML layout table 500.

At step 935, an HTML element, preferably coded as a <TABLE> tag, is emitted by the publishing program module 36. This element, when interpreted by browsing software, signifies the beginning of a table definition.

In general, the HTML table is generated by the publishing program module 36 using the relative coordinates of each cell's height and width. In the preferred embodiment, these heights and widths are calculated for the cells by referring to consecutive y-coordinates (for the height) and consecutive x-coordinates (for the width).

At step 940, the publishing program module 36 selects the first row defined by the first two consecutive y-coordinates from within the HTML table data structure 615, preferably maintained within the ohplylv array. After step 940, the preferred method 900 proceeds to step 942 on FIG. 9B.

Referring now to FIGS. 1–4, 6, 9A, and 9B, the publishing program module 36 emits an HTML element for a new row at step 942. In the preferred embodiment, the HTML element for the new row is <TR>. The cells in this new row will have a height according to the relative difference between the current consecutive y-coordinates.

At step 944, the publishing program module 36 selects the first column defined by the first two consecutive x-coordinates from within the HTML table data structure 615, preferably maintained within the ohplxlv array.

At step 946, if the cell within the framework at the current row and column is supposed to be empty, then step 946 proceeds to step 948. The cell is empty if it does not include or cover any part of any overlap region associated with any overlap group. This is preferably accomplished by calling a special function. This special function determines if the cell at the intersection of the current row and column is supposed to be empty based on information maintained within the overlap group data structures 610 for each overlap group. If the cell within the framework at the current row and column is not empty (i.e., the location of the cell corresponds to all or part of the overlap region of an overlap group), step 946 proceeds to step 950.

At step 948, the publishing program module 36 emits an HTML element representing the empty cell with the appropriate height and width. The appropriate height and width are calculated using the current consecutive y-coordinates and the current consecutive x-coordinates, respectively. The publishing program module 36 is able to merge consecutively empty cells into a single empty cell as an optimization in order to reduce the size of the HTML file 620. Using this optimization in the preferred embodiment, the publishing program module 36 basically maintains a count of consecutive empty cells on the current row. When an empty cell is encountered, the count is incremented. This continues until a cell having content is encountered or when a new row is started. At that time, an HTML element is emitted for a single empty cell representing the merged consecutive empty cells encountered on the row. In other words, several consecutively empty cells are more efficiently represented by a single HTML element for a single empty merged cell, having the height and width dimensions of several consecutively empty cells.

Furthermore, in the preferred embodiment, the publishing program module 36 has been optimized to determine if the appropriate row height or column span has already been defined for a particular row or column, respectively. If so, the publishing program module 36 does not emit these HTML element details again, thus further reducing the size of the HTML file 620. Step 948 then proceeds to step 964 on FIG. 9C after emitting the HTML element for the empty cell.

However, at step 950, the publishing program module 36 has found a part of the overlap region associated with one of the overlap groups that corresponds to the cell at intersection of the current row and column. If the part of the found overlap region is a designated part, preferably the top left part of the overlap region, then step 950 proceeds to step 952. Otherwise, the cell corresponds to another part of the overlap region and the publishing program module 36 should not populate the cell and step 950 proceeds directly to step 964 on FIG. 9C.

At step 952, all of the cells that cover or contain parts of the found overlap region are merged into a new cell. For example, the overlap region for the overlap group containing Object 1 205 covers the cells enumerated on FIG. 4 at the intersection of rows 400*b–d* and column 405*b*. These cells would be merged into the new merged cell 505, as illustrated on FIG. 5. Similarly, the overlap region with the combination of Object 3 215, Object 4 220, and Object 5 225 covers the cells enumerated on FIG. 4 at the intersection of row 400f and columns 405*b–f*. These cells would be merged into the new merged cell 510, as illustrated on FIG. 5. If there is only one cell corresponding to the found overlap region, the new cell is the same single cell and step 954 would merely refer to the new cell as the single cell already defined in the framework. Thus, at step 954, the publishing program module 36 emits an HTML element that defines the layout or dimensions of the new cell as one of the cells in the HTML layout table 500.

Generally, steps 956–962 describe emitting HTML elements characterizing the content of the new cell. The content represents the objects 205–225, corresponding to the new cell, as laid out on the page 200 within the overlap region.

At step 956, if there is only a single object having a predefined rendering characteristic within the found overlap region, then step 956 proceeds to step 958. As previously mentioned, the predefined rendering characteristic is generally a feature of an object allowing an element of the table to be rendered as a native text element while preserving the appearance of the object. In the preferred embodiment, the predefined rendering characteristic includes unrotated text, no gradient or pattern filled background, and no border art. Border art can include such items as ribbons surrounding the text. Otherwise, step 956 proceeds to step 960.

At step 958, the publishing program module 36 emits an HTML native text element having the appropriate height and width into the HTML stream. The emitted HTML native text element corresponds to the content from the single object. In this manner, the overlap group with the single object can be represented by the HTML native text element, which is more memory efficient when compared to an HTML image element that represents the overlap group in the found overlap region. Step 958 proceeds directly to step 964 on FIG. 9C.

At step 960, the publishing program module 36 preserves the layout of the objects in the found overlap region by rendering an image of the overlap region containing those objects. For example, the publishing program module 36 would render an image containing Object 3 215, Object 4 220, and Object 5 225 as they are laid out on the overlap region defined by the rectangle 310 encompassing this combination of objects.

At step 962, the publishing program module 36 emits an HTML image element, preferably using an <IMG> tag, into the HTML stream. The emitted HTML image element preserves the layout of objects within the found overlap region. Thus, the new cell is populated either by an HTML native text element or an HTML image element, both of which preserve the layout of objects within the cell of the HTML layout table 500.

Referring now to FIGS. 1, 2, 3, 4, 6, 9A–9C, if the current column is not the last one in the current row, step 964 proceeds to step 966. At step 966, the next column is determined using the next consecutive x-coordinates maintained in the HTML table data structure 615. The difference between the next consecutive x-coordinates defines the width of the next column. After determining the next column in the current row, step 966 proceeds back to step 946. However, if the current column in step 964 is the last one in the current row, step 964 proceeds to step 968.

At step 968 if the current row is not the last one in the HTML layout table 500, step 968 proceeds to step 970. At step 970, the next row is determined using the next consecutive y-coordinates maintained in the HTML table data structure 615. The difference between the next consecutive y-coordinates defines the height of the next row. After determining the next row, step 970 proceeds back to step 942. However, if the current row in step 968 is the last one in the HTML table data structure 615, step 968 proceeds to step 972.

At step 972, the publishing program module 36 emits an HTML element, preferably a </TABLE> tag, into the HTML stream signifying the end of the HTML layout table 500 definition. In summary, the HTML stream of HTML elements defines the HTML layout table 500 and is stored within the HTML file 620. This HTML layout table 500 represents an online version of the page 200 that preserves the layout of objects as they appear on the page 200 without the need to create a single image or object representing the entire page 200.

Preserving Existing Hyperlinks within the HTML Layout Table

As previously mentioned, the publishing program module 36 is capable of preserving an existing hyperlink by creating an image map relative to the overlap group containing the object having the existing hyperlink. In the preferred embodiment, it is easier to link the image itself (rather than use an image map) if the image is the only object in the overlap group.

The image map essentially provides the location or "hot region" associated with the existing hyperlink relative to the location of the object within the overlap group. Clicking on a hot region, whether the hot region covers the whole overlap group or just a part thereof, using the mouse 42 activates the existing hyperlink to another linked document. If more than one existing hyperlink is associated with objects within a single overlap group, the publishing program module 36 is able to include corresponding image maps for each existing hyperlink within the single overlap group.

FIG. 10 is a flow diagram illustrating the preferred steps for preserving existing hyperlinks associated with objects when creating a table from a layout of the objects on a page. Essentially, FIG. 10 illustrates the preferred additional steps when emitting HTML elements to populate the cells of an HTML layout table in the context of the preferred steps for creating the HTML layout table from FIG. 9A–C. These preferred additional steps illustrated in FIG. 10 can be used to preserve the existing hyperlinks associated with objects on the page when creating the HTML layout table.

Referring now to FIGS. 1, 2, 5, 9B, 9C and 10, the preferred method 1000 includes steps 1005–1020. After the publishing program module 36 has emitted an HTML native text element into the HTML stream at step 958, step 958 proceeds to step 1005 (instead of directly to step 964 as illustrated in FIG. 9B).

At step 1005, if there no existing hyperlinks associated with the single object in the found overlap region, then step 1005 proceeds directly to step 964. However, if there is at least one existing hyperlink associated with the single object in the found overlap region, step 1005 proceeds to step 1010.

At step 1010, the publishing program module 36 preserves the existing hyperlink by emitting an HTML element, generally referred to as an HTML hyperlink element, representing the existing hyperlink. The implementation of the HTML hyperlink element preserving the existing hyperlink depends on the nature of the existing hyperlink. After the HTML hyperlink element is emitted, step 1010 proceeds to step 964.

If there is more than one object in the overlap group associated with the existing hyperlink, then objects are generally represented by an image element. In this situation, the hyperlink element is typically defined as an image map associated with the image element. Generally, an image map is a list of coordinates of the existing hyperlinks relative to the image element. In the preferred embodiment, the coordinates within the image map show the locations of existing hyperlinks relative to the top left location within the image element.

Alternatively, if there is only a single image in the overlap group associated with the existing hyperlink or if there is only a single object within the overlap group meeting the predefined rendering characteristic, then the hyperlink element is typically defined as an <A> tag. The <A> tag may be used to preserve any existing hyperlinks because the <A> tag is easily inserted within the HTML stream of native text in order to designate any existing hyperlink. However, if the single object within the overlap group does not meet the predefined rendering characteristic, the single object must be rendered as an image element and the hyperlink element is an image map associated with the image element.

Steps 1015 and 1020, which are inserted between step 962 and step 964, cover the situation where the cell is populated with an HTML image element. After the publishing program module 36 emits the HTML image element into the HTML stream at step 962, the publishing program module 36 determines if there are any existing hyperlinks in any object in the found overlap region. If so, then step 1015 proceeds to step 1020. Otherwise, step 1015 proceeds directly to step 964.

At step 1020, the publishing program module 36 preserves any existing hyperlinks by emitting an HTML hyperlink element associated with the HTML image element. As described above, the exact kind of hyperlink element, e.g., an <A> tag or an image map, depends on the context of the existing hyperlink.

For example, Object 3 215, Object 4 220, and Object 5 225 may appear in the found overlap region (i.e., the part of the page within the rectangle 310 surrounding the combination of objects) with several hyperlinks 217, 227, 229 associated with Object 4 220 and Object 5 225. The publishing program module 36 emits an HTML hyperlink element specifying an image map. The image map has shaped regions 511–513 located relative to the specific objects 215–225 and existing hyperlinks 217, 227, 229 in order to preserve these hyperlinks. After the HTML hyperlink element is emitted, step 1020 proceeds to step 964.

Text Adornments

Another aspect of the present invention involves using such an HTML layout table 500 in a nested fashion to efficiently create text or frame adornments associated with an object, such as a border, a margin, or a drop shadow. This situation occurs when an HTML layout table is essentially the contents of a single cell within a larger HTML layout table. For example, Object 2 210 (FIG. 2) may be an object having only unrotated text. The user may desire to have an adornment feature associated with the object (such as margins for the text or a border around the text or a drop-shadow around the text) without having to create an HTML image element of the object and the associated adornments. A nested HTML layout table provides a representation of the object along with each of the adornment features without using an HTML image element, which requires more memory and more time to download. FIGS. 11–13 illustrate the use of an HTML layout table 500 to provide such adornments, as described below.

Figure 11A:
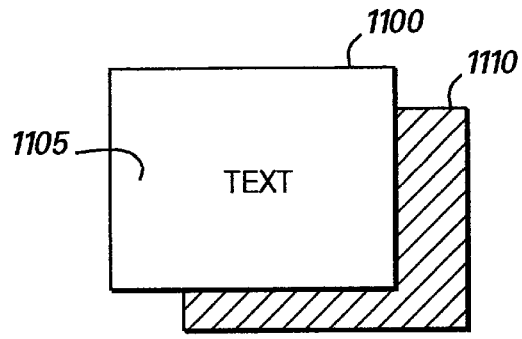
FIG. 11, consisting of FIGS. 11 A–C, is a diagram illustrating exemplary text adornments associated with an object.
Figure 11B:
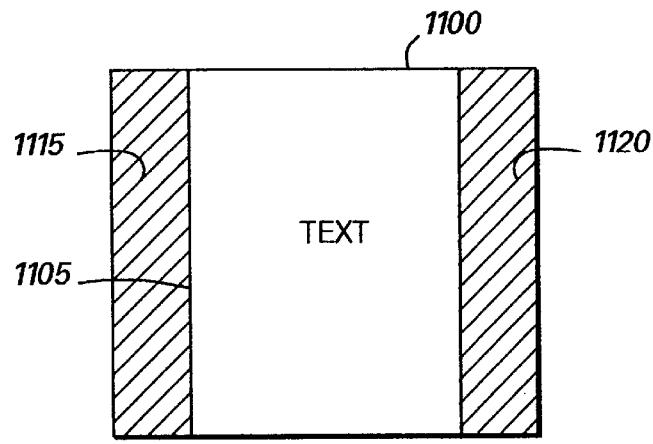
Figure 11C:
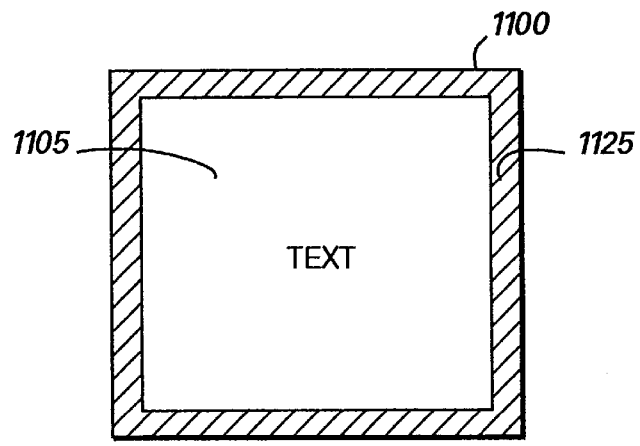

FIG. 11, consisting of FIGS. 11A–C, is a diagram illustrating exemplary text adornments associated with an exemplary object. The exemplary object is similar to Object 2 210 and has unrotated text. Referring now to FIGS. 4 and 11A–C, an exemplary object 1100 is shown containing the content of a text frame 1105 and having a drop-shadow 1110 along the bottom and right-hand side of the text object 1100. The drop-shadow 1100 may be colored or shaded, depending on the user's preference. In FIG. 11B, the exemplary object 1100 is shown containing the content of the text frame 1105 and having a left margin 1115 and a right-hand margin 1120. Finally, in FIG. 11C, the exemplary object 1100 is shown containing the content of a text frame 1105 and having a border 1125 surrounding the unrotated text 1105 of the exemplary object 1100.

Figure 12A:
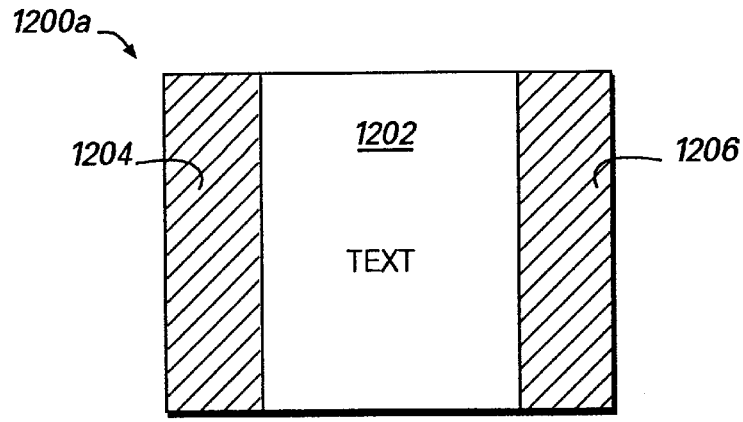
FIG. 12, consisting of FIGS. 12A–C, is a diagram illustrating exemplary nested tables with an object and exemplary text adornments.
Figure 12B:
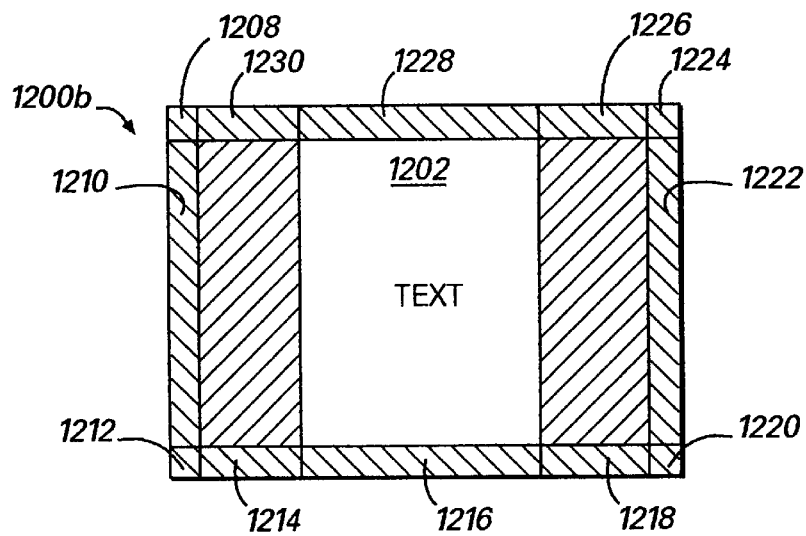
Figure 12C:
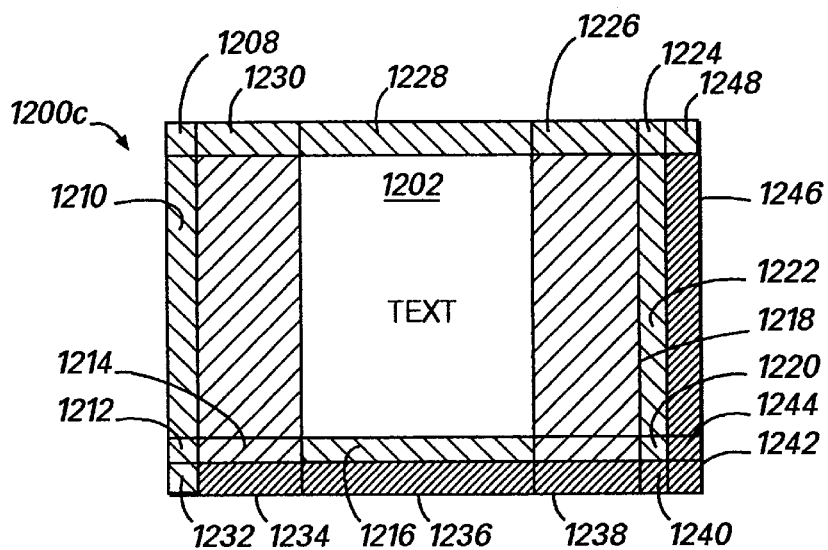
Figure 13:
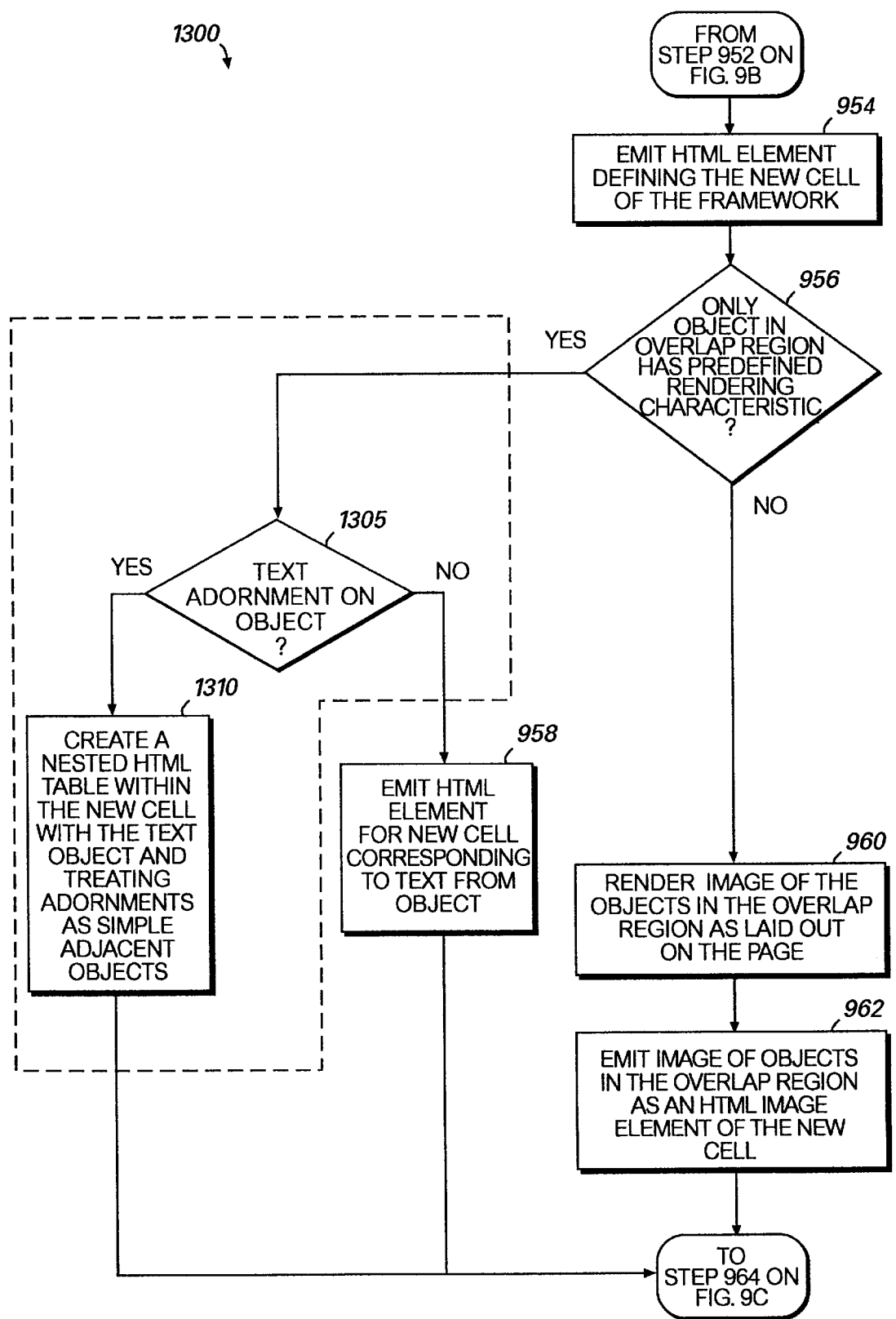
FIG. 13 is a flow diagram illustrating the preferred steps for using a nested table to provide text adornments, such as drop-shadows, margins, or borders, to an object represented within a cell of a table.

FIG. 12, consisting of FIGS. 12A–C, is a diagram illustrating a framework of cells of exemplary nested HTML layout tables, each having an exemplary object and exemplary text adornments. Referring now to FIGS. 4, 11, and 12, FIGS. 12A–C correspond to FIGS. 11A–C, respectively, and illustrate the exemplary object 1100 and the various adornment features in frameworks of nested HTML layout tables 1200a–c. Each of the nested HTML layout tables 1200a–c is a framework of cells, one of which contains the exemplary object 1100 and other others containing parts of the adornment features.

In FIG. 12A, an exemplary margin HTML layout table 1200a represents the exemplary object 1100 with margins 1115–1120 and is characterized by several cells. The middle cell 1202 contains the text 1105 of the exemplary object 1100. The two outside cells 1204, 1206 contain margins 1115, 1120. Although the margins 1115–1120 are illustrated in FIG. 12A as being hatched, this is merely for clarity. As previously mentioned, the margins 1115–1120 are not typically colored or shaded. Thus, the overall layout of cells in this HTML layout table 1200a shows the exemplary object 1100 being adorned by vertical margin features 1115–1120.

In FIG. 12B, the margin HTML layout table 1200a from FIG. 12A is nested within an exemplary border HTML layout table 1200b. In other words, this exemplary border HTML layout table 1200b represents the nested margin HTML layout table 1200a (i.e., the text 1105 and the margins 1115, 1120) adorned with the border 1125. The exemplary border HTML layout table 1200b is characterized by several cells. The middle three cells 1202–1206 contain the text 1105 and margins 1115–1120, respectively. These cells 1202–1206 are considered the content area of the exemplary border HTML layout table 1200b. The cells 1208–1230 surrounding the content area contain parts of the shaded or colored border. In the preferred embodiment, each part of the border may be colored individually. In summary, the overall layout of cells in this exemplary border HTML layout table 1200b represents nested content (via the nested margin HTML layout table 1200a) adorned with a surrounding border feature 1125 that is shaded or colored.

In FIG. 12C, a further level of nesting layout tables is illustrated. The exemplary border HTML layout table 1200b (already having the margin table 1200a nested within it) is illustrated being nested within an exemplary drop-shadow HTML layout table 1200c. The content area of the exemplary drop-shadow HTML layout table 1200c includes the cells 1202–1230 representing the text 1105, the margins 1115–1120, and the border 1125 (i.e., the margin table 1200a nested within the border table 1200b). In addition to the content area, the drop-shadow table 1200c includes other cells 1234–1246 representing parts of the shaded or colored drop-shadow. Two of these cells (i.e., the cell on the upper right corner 1248 and the cell on the lower left corner 1232) are empty cells to give the drop-shadow visual effect. Thus, the overall layout of cells in this exemplary drop-shadow HTML layout table 1200c represents nested content (via the nested border HTML layout table 1200b and the nested margin layout table 1200a) adorned by the drop-shadow feature 1110.

In summary, the exemplary object 1100 containing the text 1105 and each part of the adornment features may be treated as distinct objects. An HTML layout table may be created to represent the adorned object using the preferred methods described herein. The representation of the adorned object can then be used to populate a cell of a larger HTML layout table representing a page of objects. More particularly, an HTML layout table, such the exemplary margin HTML layout table 1200a, can be created and used as a nested table in order to populate cells (the content area) in the larger HTML layout table 500. The number of nested HTML layout tables required to represent the adorned object depends on how many types of adornment features are used with the content of the object.

In an example, Object 2 210 (FIG. 4) may be an object having a predefined rending characteristic so that it may be represented by an HTML native text element. The user may desire to adorn Object 2 210 with a margin. An HTML layout table (such as the exemplary margin HTML layout table 1200a) can efficiently represent Object 2 210 and its adorning margin within the cell 515 (FIG. 5) in the HTML layout table 500 normally populated with Object 2 210. In this manner, the margin table 1200a is nested within the larger HTML layout table 500 representing the page 200.

One skilled in the art will realize that adornment features are not limited to the specific examples shown in FIGS. 11 and 12. Adornments may include a combination of a border and a margin, or any other adorning features that may be characterized as objects that modify the adorned object.

Using nested HTML layout tables to represent adornment feature is additionally advantageous when the content area of an adornment table, such as the exemplary border HTML layout table 1200b, gets larger. The content area may become larger when a user changes the point size preference for text in the browsing software used to view the online version of a page 200. When the content area becomes larger, the adornment features (such as cells with parts of the border) can correspondingly grow. This has not been possible when using images to represent the adornment feature.

FIG. 13 is a flow diagram illustrating the preferred steps for using a nested HTML layout table to efficiently provide text adornments, such as drop-shadows, margins, or borders, to objects represented within a cell of a larger HTML layout table. Essentially, FIG. 13 illustrates two preferred additional steps when emitting HTML elements to populate the cells in the context of the preferred steps for creating the HTML layout table 500 from FIG. 9A–C. These preferred additional steps illustrated in FIG. 13 allow an adornment feature to be provided to an object, such as Object 2 210, when creating the HTML layout table 500. The adornment feature is provided by actually embedding another HTML layout table in a single cell of the HTML layout table 500. One skilled in the art will recognize the ability to embed or nest multiple HTML layout tables to represent multiple adornment features is contemplated by the present invention, as illustrated in FIGS. 12B–12C.

Referring now to FIGS. 1, 2, 4, 5, 9B, 9C, 11, 12, and 13, the preferred method 1300 includes steps 1305–1310. After the publishing program module 36 has determined if there is only a single object having a predefined rendering characteristic within the found overlap region at step 956, step 956 proceeds to step 1305 (instead of directly to step 958 as illustrated in FIG. 9B).

At step 1305, if a text or frame adornment is not associated with the single object in the found overlap region, then step 1305 proceeds directly to step 958 where an HTML native text element is emitted for the new cell. However, if a text or frame adornment is associated with the single object in the found overlap region, then step 1305 proceeds to step 1310.

At step 1310, the publishing program module 36 creates a nested HTML layout table from the object and the adornments associated with the object. This is preferably accomplished by going through the preferred steps illustrated in FIGS. 9A–C. In this manner, the publishing program module 36 is able to embed the definition of a nested HTML layout table within the HTML stream during a definition of a larger HTML layout table. After the nested HTML layout table representing the object and the adornments is created at step 1310, step 1310 proceeds to step 964.

In one example, Object 2 210 may be an object with having a predefined rendering characteristic in the found overlap region. Additionally, there may be text adornments associated with Object 2 210. If so, the publishing program module 36 is capable of adorning Object 2 210 with these text adornments using one or more nested HTML layout tables according to the present invention, as illustrated in FIGS. 12B–12C.

In summary, one aspect of the present invention creates HTML layout tables, which preserves the layout of objects from a page in an efficient manner. Another aspect of the present invention, described relative to FIGS. 11–13, repeatedly uses the first aspect of the present invention to create nested HTML layout tables to provide a way to provide or represent one or more text adornments for objects on the page in an efficient manner.

Conclusion

From the foregoing description, it will be appreciated that the present invention provides a system for creating a table, preferably called an HTML layout table 500, from a layout of objects 205–225 on a page 200. The publishing program module 36 arranges the objects 205–225 into overlap groups. Each overlap group is bound by a perimeter, such as a rectangle 300–310, and contains objects that, as a group, overlap each other while each overlap group does not overlap any other overlap group. In this manner, the page is divided into distinct regions (within each non-overlapping rectangle 300–310) that contain the objects 205–225 as laid out on the page 200. The location of each of the non-overlapping rectangles 300–310 provides the location for horizontal and vertical boundaries or lines. These lines define rows 400a–g and columns 405a–g of a framework. The intersection of each row and column is a cell, used as a cell in the HTML layout table 500 representing the page 200. The publishing program module 36 emits HTML elements into an HTML stream in order to define the layout of cells and populate each cell as either empty or with HTML elements representing objects in one of the overlap groups corresponding to the location of the cell. The HTML elements representing non-empty cells ;-are either native text elements or image element. The HTML elements represent and preserve the layout of objects within each overlap group in a memory efficient manner. Additional HTML elements can be added to a cell to preserve and existing hyperlinks. Furthermore, the publishing program module 36 is able to create a nested HTML layout table within cell of a larger HTML layout table in order to provide or represent text adornments associated with objects 205–225 on the page 200 in an efficient manner.

The foregoing system may be conveniently implemented in a program module that is based upon the flow charts in FIGS. 7, 8, 9, 10, and 13. No particular programming language has been required for carrying out the various procedures described above because it is considered that the operations, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes.

The present invention has been described in relation to particular embodiments which are intended in all respects to be illustrative rather than restrictive. The particular embodiment described is one of creating and using an HTML layout table 500 that preserves the layout of objects 205–225 on a page 200, and preserves existing hyperlinks 217, 227, 299 associated with the objects 220, 225. However, those skilled in the art will understand that the principles of the present invention apply to any processes that create online versions of documents that preserve the layout of the documents.

Alternative embodiments will become apparent to those skilled in the art to which the present invention pertains without departing from its spirit and scope. Accordingly, the scope of the present invention is defined by the appended claims rather than the foregoing description.

What is claimed is:

1. A method for creating a table from a layout of a plurality of objects, comprising the steps of:

identifying each of the objects relative to their location on a page;

creating at least one overlap group of the objects from the layout of the objects, each overlap group containing at least one object and any other object that overlaps the at least one of the objects, each overlap group being bound by one of a plurality of perimeters, wherein if a first object and a second object overlap each other, an overlap group containing the first object and the second object is created;

creating a framework of cells defining the table from the perimeters bounding each overlap group, the framework defined by rows and columns, each row defined by the top boundary of each perimeter and the bottom boundary of each perimeter, each of the columns defined by the left boundary of each perimeter and the right boundary of each perimeter, the intersection of each row and each column defining the location of each cell within the table; and populating each cell that corresponds to the location of each overlap group with at least one element representing the objects within each overlap group as laid out on the page, thereby creating the table from the layout of objects.

2. The method of claim 1, wherein the step of creating the overlap groups comprises:

(a) placing one of the perimeters around each of the objects;

(b) determining if any of the perimeters overlap each other;

(c) if any of the perimeters overlap each other, replacing the overlapping perimeters with another perimeter which surrounds each of the objects within the overlapping perimeters; and repeating steps (b)–(c) until no more of the perimeters overlap each other; and defining each of the overlap groups as a group of at least one of the objects bounded by one of the remaining perimeters that does not overlap any others of the perimeters.

3. The method of claim 1, wherein each perimeter bounds an area of the page called an overlap region; and wherein the populating step comprises the steps, if one of the cells corresponds to a designated part of the overlap region for one of the overlap groups, of:

merging all of the cells containing parts of the overlap region into a new cell within the framework of the table, and populating the new cell with the at least one element representing the objects within the overlap region as the objects are laid out on the page.

4. The method of claim 3, wherein the at least one element is a text element if the overlap group associated with the overlap region contains only one of the objects having a predefined rendering characteristic.

5. The method of claim 4, wherein the predefined rendering characteristic is a feature of the one of the objects allowing the at least one element to be rendered as the text element while preserving the appearance of the overlap group.

6. The method of claim 5, wherein the predefined rendering characteristic is unrotated text, no gradient filled background, no pattern filled background, and no border art.

7. The method of claim 3, wherein the at least one element is an image element of the overlap region if the overlap group associated with the overlap region does not contain only one of the objects having a predefined rendering characteristic.

8. The method of claim 7, wherein the predefined rendering characteristic is a feature of the one of the objects allowing the at least one element to be rendered as the text element while preserving the appearance of the overlap group.

9. The method of claim 8, wherein the predefined rendering characteristic is unrotated text, no gradient filled background, no pattern filled background, and no border art.

10. The method of claim 7, wherein the populated new cell also contains a hyperlink element relative to the overlap region if the overlap group contains an existing hyperlink, the hyperlink element providing the location of the existing hyperlink relative to the overlap group.

11. The method of claim 10, wherein the hyperlink element specifies an image map, the image map providing at least one shaped region relative to the location of the overlap group as represented by the image element in order to provide the location of the existing hyperlink.

12. The method of claim 3, wherein the populated new cell contains a nested table comprising a plurality of nested cells, only one of the nested cells populated with unrotated text and at least one of the remaining nested cells populated with an adornment feature associated with the unrotated text.

13. The method of claim 12, wherein the adornment feature is a margin associated with the unrotated text.

14. The method of claim 12, wherein the adornment feature is a border used to surround the unrotated text.

15. The method of claim 12, wherein the adornment feature is a shadow associated with the unrotated text.

16. A method for creating a table from a layout of a plurality of objects, comprising the steps of:

(a) identifying each of the objects relative to their location on a page;

(b) creating at least one overlap group of the objects based upon the location of the objects, each overlap group containing at least one object and any other object that overlaps the at least one object, wherein if a first object and a second object overlap each other, an overlap group containing the first object and the second object is created;

(c) bounding each of the overlap groups within one of a plurality of non-overlapping rectangles, each non-overlapping rectangle defined by its bounding coordinates, each non-overlapping rectangle bounding an area of the page called an overlap region containing one or more of the objects;

(d) storing the bounding coordinates of each non-overlapping rectangle within a table data structure as a plurality of x-coordinates and a plurality of y-coordinates;

(e) creating a framework of cells defining the table from the coordinates, the framework defined by rows and columns, each row defined by the y-coordinates, each column defined by the x-coordinates, the intersection of each row and each column defining the location of each cell within the table; and (f) if one of the cells of the table corresponds to a designated part of the overlap region associated with one of the overlap groups, then merging all of the cells containing parts of the overlap region into a new cell within the framework of the table before populating the new cell with at least one element representing the objects within the overlap region as the objects are laid out on the page, thereby creating the table from the layout of objects.

17. The method of claim 16, wherein steps (b) and (c) comprise:

(b1) placing one of a plurality of bounding rectangles around each of the objects;

(b2) determining if any of the bounding rectangles overlap each other;

(b3) if any of the bounding rectangles overlap each other, replacing the overlapping bounding rectangles with another of the bounding rectangles which surrounds each of the objects within the overlapping bounding rectangles;

repeating steps (b2)–(b3) until no more of the bounding rectangles overlap each other; and defining each of the overlap groups as a group of at least one of the objects bounded by one of the remaining bounding rectangles that does not overlap any others of the bounding rectangles, the remaining of the bounding rectangles designated as the non-overlapping rectangles.

18. The method of claim 16, wherein the at least one element is a text element if the overlap group associated with the overlap region contains only one of the objects having a predefined rendering characteristic.

19. The method of claim 18, wherein the predefined rendering characteristic is a feature of the one of the objects allowing the at least one element to be rendered as the text element while preserving the appearance of the overlap group.

20. The method of claim 19, wherein the predefined rendering characteristic is unrotated text, no gradient filled background, no pattern filled background, and no border art.

21. The method of claim 16, wherein the at least one element is an image element if the overlap group associated with the overlap region does not contain only one of the objects having a predefined rendering characteristic.

22. The method of claim 21, wherein the predefined rendering characteristic is a feature of the one of the objects allowing the at least one element to be rendered as the text element while preserving the appearance of the overlap group.

23. The method of claim 22, wherein the predefined rendering characteristic is unrotated text, no gradient filled background, no pattern filled background, and no border art.

24. The method of claim 21, wherein the at least one element also includes a hyperlink element relative to the overlap region if at least one of the objects within the overlap group contains an existing hyperlink, the hyperlink element providing the location of the existing hyperlink relative to the overlap group.

25. The method of claim 24, wherein the hyperlink element specifies an image map, the image map providing at least one shaped region relative to the location of the at least one of the objects as represented by the image element in order to provide the location of the existing hyperlink.

26. The method of claim 16, wherein the at least one element is a nested table comprising a plurality of nested cells, one of the nested cells populated with a text element and only one of the remaining nested cells populated with an adornment element associated with the text element, and a shadow associated with the text element.

27. A computer-readable medium on which is stored a computer program for creating a hypertext markup language (HTML) table from a layout of a plurality of objects, the computer program comprising instructions, which when executed by a computer, perform the steps of:

(a) identifying each of the objects relative to their location on a page;

(b) creating at least one overlap group of the objects based upon the location each object, each overlap group containing at least one object and any other object that overlaps the at least one object, wherein if a first object and a second object overlap each other, an overlap group containing the first object and the second object is created;

(c) bounding each of the overlap groups within one of a plurality of non-overlapping rectangles, each non-overlapping rectangle defined by its bounding coordinates, each non-overlapping rectangle bounding an area of the page called an overlap region containing at least one of the objects;

(d) storing the bounding coordinates of each non-overlapping rectangle within an HTML table data structure as a plurality of x-coordinates and plurality of y-coordinates;

(e) creating a framework of cells defining the HTML table from the coordinates, the framework defined by rows and columns, each row defined by the y-coordinates, each column defined by the x-coordinates, the intersection of each row and each column defining the location of each cell within the HTML table;

(f) if one of the cells corresponds to a designated part of the overlap region associated with one of the overlap groups, then merging all of the cells containing parts of the overlap region into a new cell within the framework of the HTML table;

(g) if the overlap group associated with the overlap region contains only one object having a predefined rendering characteristic, then emitting an HTML native text element for the new cell into an HTML stream, the HTML native text element corresponding to the one of the objects; and (h) if the overlap group associated with the overlap region does not contain only one object having the predefined rendering characteristic, then emitting an HTML image element into the HTML stream for the new cell corresponding to the area of the page defined by the overlap region, the HTML stream defining the HTML table, thereby creating the HTML table from the layout of the objects.

28. The computer-readable medium of claim 27, wherein the predefined rendering characteristic is a feature of the object allowing the overlap group to be rendered as the HTML text element while preserving the appearance of the overlap group.

29. The computer-readable medium of claim 28, wherein the predefined rendering characteristic is unrotated text, no gradient filled background, no pattern filled background, and no border art.

30. The computer-readable medium of claim 27, wherein steps (b) and (c) comprise:

(b1) placing one of a plurality of bounding rectangles around each object so that each object is individually encompassed by the one of the bounding rectangles;

(b2) determining if any of the bounding rectangles overlap each other;

(b3) if any of the bounding rectangles overlap each other, replacing the overlapping bounding rectangles with another of the bounding rectangles which surrounds each object within the overlapping bounding rectangles;

repeating steps (b2)–(b3) until no more of the bounding rectangles overlap each other; and defining each overlap group as a group of at least one object bounded by one of the remaining bounding rectangles that does not overlap any other bounding rectangle, the remaining bounding rectangles designated as the non-overlapping rectangles.

31. The computer-readable medium of claim 27, wherein the instructions, which when executed by the computer, further comprise the step of emitting an HTML hyperlink element for the new cell if the overlap group contains an existing hyperlink, the HTML hyperlink element providing the location of the existing hyperlink relative to the overlap group.

32. The computer-readable medium of claim 31, wherein the HTML hyperlink element specifies an HTML image map, the HTML image map providing at least one shaped region relative to the location of the overlap group as represented by the HTML image element in order to provide the location of the existing hyperlink.

33. The computer-readable medium of claim 27, wherein the HTML native text element is represented by a nested HTML table comprising a plurality of nested cells, only one of the nested cells being described by the HTML native text element containing unrotated text and at least one of the other nested cells described by an adornment element associated with the HTML native text element.

34. The computer-readable medium of claim 33, wherein the adornment element is at least one nested cell within the nested HTML table that represents one of a margin associated with the HTML native text element, a border used to surround the HTML native text element, and a shadow associated with the HTML native text element.

35. A computer system for creating a table from a layout of a plurality of objects, comprising:

a processor;

an input device coupled to the processor;

a pixel-based display device coupled to the processor;

a memory storage device coupled to the processor for maintaining the table data structure; and the processor being operative to:
(a) identify each of the objects relative to their location on a pagedisplayed on the pixel-based display device,
(b) create at least one overlap group of the objects based upon the location of the objects, each overlap group containing at least one object and any other object that overlaps the at least one object, wherein if a first object and a second object overlap each other, an overlap group containing the first object and the second object is created,
(c) bound each overlap group within one of a plurality of non-overlapping rectangles, each non-overlapping rectangle defined by its bounding coordinates, each non-overlapping rectangle bounding an area of the page called an overlap region containing at least one object,
(d) store the bounding coordinates of each non-overlapping rectangle within the table data structure as a plurality of x-coordinates and a plurality of y-coordinates,
(e) sort the x-coordinates into ascending order and delete duplicate x-coordinates from the table data structure maintained on the memory storage device,
(g) sort the y-coordinates into ascending order and delete duplicate y-coordinates from the table data structure maintained on the memory storage device,
(h) create a framework of cells defining the table from the coordinates, the framework defined by rows and columns, each row defined by the y-coordinates, each column defined by the x-coordinates, the intersection of each row and each column defining the location of each cell within the table,
(i) if one of the cells corresponds to a designated part of the overlap region associated with one of the overlap groups, then the processor is operative to merge all of the cells containing parts of the overlap region into a new cell within the framework of the table, and
(j) populate the new cell with at least one element representing the objects within the overlap region as the objects are displayed on the page in the layout of the objects.

36. The computer system of claim 35, wherein the at least one element is a text element if the overlap group associated with the overlap region contains only one of the objects having a predefined rendering characteristic.

37. The computer system of claim 36, wherein the predefined rendering characteristic is a feature of the one of the objects allowing the at least one element to be rendered as the text element while preserving the appearance of the overlap group.

38. The computer system of claim 37, wherein the predefined rendering characteristic is unrotated text, no gradient filled background, no pattern filled background, and no border art.

39. The computer system of claim 35, wherein the at least one element is an image element of the overlap region if the overlap group associated with the overlap region does not contain only one of the objects having unrotated text, the image element corresponding to the area of the page defined by the overlap region.

40. The computer system of claim 39, wherein the predefined rendering characteristic is a feature of the one of the objects allowing the at least one element to be rendered as the text element while preserving the appearance of the overlap group.

41. The computer system of claim 40, wherein the predefined rendering characteristic is unrotated text, no gradient filled background, no pattern filled background, and no border art.

42. The computer system of claim 39, wherein the at least one element also includes a hyperlink element, the hyperlink element specifying an image map of the overlap region if at least one object within the overlap group contains an existing hyperlink, the image map providing at least one shaped region relative to the location of the overlap group as represented by the image element in order to provide the location of the existing hyperlink.

43. The computer system of claim 35, wherein the at least one element is a nested table comprising a plurality of nested cells, one of the nested cells populated with an unrotated text element and at least one of the remaining nested cells populated with an adornment element associated with the unrotated text element.

44. The computer system of claim 43, wherein the adornment element is one of a margin associated with the unrotated text element, a border used to surround the unrotated text element, and a shadow associated with the unrotated text element.

* * * * *